United States Patent
Xiong et al.

(10) Patent No.: US 10,622,887 B1
(45) Date of Patent: Apr. 14, 2020

(54) ADAPTIVE OFF TIME CONTROL TO IMPROVE TOTAL HARMONIC DISTORTION AND POWER FACTOR FOR CRITICAL MODE FLYBACK TYPE PFC CIRCUITS

(71) Applicant: Universal Lighting Technologies, Inc., Madison, AL (US)

(72) Inventors: Wei Xiong, Madison, AL (US); Dane Sutherland, Madison, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 0 days.

(21) Appl. No.: 16/425,112

(22) Filed: May 29, 2019

Related U.S. Application Data

(60) Provisional application No. 62/691,653, filed on Jun. 29, 2018.

(51) Int. Cl.
*H02M 1/42* (2007.01)

(52) U.S. Cl.
CPC ....... *H02M 1/4258* (2013.01); *H02M 1/4241* (2013.01)

(58) Field of Classification Search
CPC .......................... H02M 1/4241; H02M 1/4258
See application file for complete search history.

(56) References Cited

U.S. PATENT DOCUMENTS

| | | | | |
|---|---|---|---|---|
| 2010/0320934 | A1* | 12/2010 | Liu | H02M 1/4258 315/294 |
| 2016/0336861 | A1* | 11/2016 | Gritti | H02M 3/33507 |
| 2019/0044442 | A1* | 2/2019 | Schaef | H01L 28/10 |

OTHER PUBLICATIONS

B. T. Irving and M. M. Jovanovic, "Analysis and design of self-oscillating flyback converter," APEC. Seventeenth Annual IEEE Applied Power Electronics Conference and Exposition (Cat. No. 02CH37335), Dallas, TX, USA, 2002, pp. 897-903 vol. 2. (Year: 2002).*
C. Adragna, "Primary-controlled high-PF flyback converters deliver constant dc output current," Proceedings of the 2011 14th European Conference on Power Electronics and Applications, Birmingham, 2011, pp. 1-10 (Year: 2011).*

* cited by examiner

*Primary Examiner* — Gary L Laxton
*Assistant Examiner* — Peter M Novak
(74) *Attorney, Agent, or Firm* — Patterson Intellectual Property Law, P.C.; Gary L. Montle; Jerry Turner Sewell

(57) ABSTRACT

A zero current detector control circuit controls a voltage applied to a zero current detector (ZCD) input of a power factor corrector integrated circuit (PFC IC) that produces a driver output having an on time and an off time. The zero current detector control circuit includes a voltage detection input circuit coupled to a rectified AC input voltage. The detector control circuit generates a control voltage applied to a control terminal of an electronic switch. When the rectified AC input voltage has a phase angle in a first portion or in a last portion of a half-cycle, the electronic switch conducts to connect a capacitor to the ZCD input of the PFC IC. The capacitor causes the fall time of the trailing edge of a pulse applied to the ZCD input to increase, which causes the off time of the driver output of the PFC IC to increase.

9 Claims, 7 Drawing Sheets

BLOCK DIAGRAM OF POWER FACTOR CORRECTOR IC

ADAPTIVE OFF TIME CONTROL TO IMPROVE TOTAL HARMONIC DISTORTION AND POWER FACTOR FOR CRITICAL MODE FLYBACK TYPE PFC CIRCUITS

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCE TO RELATED APPLICATION

This application claims the benefit under 35 USC. § 119(e) of U.S. Provisional Application No. 62/691,653, filed Jun. 29, 2018, entitled "Adaptive OFF Time Control to Improve Total Harmonic Distortion and Power Factor for Critical Mode Flyback Type PFC Circuits," which is hereby incorporated by reference in its entirety.

FIELD OF THE INVENTION

The present disclosure relates generally to two-stage power supply circuits having a power factor correction circuit as a first stage and a DC-DC converter as a second stage.

BACKGROUND

A typical power supply circuit receives power from an AC source. During a normal mode of operation, the power supply circuit generates either a constant voltage or a constant current to a DC load. The power supply circuit includes a first-stage power factor correction circuit that operates to maintain the current drawn from the AC source substantially in phase with the voltage of the AC source. The power factor correction circuit provides a first-stage output voltage to a second-stage DC-to-DC converter circuit. The second-stage DC-to-DC converter circuit generates the constant voltage or the constant current for the DC load.

The power factor correction circuit may be based on a boost converter or a buck-boost converter. One type of buck-boost converter is a flyback converter. A boost converter can only produce an output voltage that is greater than the input voltage. A flyback converter can also produce an output voltage that is greater than the input voltage. Unlike a boost converter, a flyback converter can also produce an output voltage that is less than the input voltage. Although both types of converters can be used in a power factor correction (PFC) circuit, a PFC converter based on a boost converter topology typically can achieve a greater power factor (e.g., closer to 1) than a PFC converter based on a flyback topology. A PFC converter based on a boost converter topology typically has a lower total harmonic distortion than a PFC converter based on a flyback technology. The foregoing is summarized in the following table for an exemplary 50-watt PFC:

TABLE I

Power Factor (PF) and THD for 50-watt Flyback PFC and Boost Type PFC

| | 50-Watt PFC | | | |
|---|---|---|---|---|
| | Flyback Type PFC | | Boost Type PFC | |
| $V_{IN}$ | THD | PF | THD | PF |
| 120 V | 8% | 0.96 | 3% | 0.99 |
| 277 V | 18% | 0.9 | 8% | 9.96 |

Table I illustrates that a lower power factor and greater total harmonic distortion (THD) is a drawback for using flyback type PFC converter circuits instead of boost type PFC converter circuits.

As is well known in the art, a reduced power factor results from two main contributing factors. One factor is the THD of the line current. Another factor is a phase-shift β between the line current and the line voltage. The power factor (PF) can be defined in terms of the two contributing factors as follows:

$$PF = \frac{1}{\sqrt{1+(THD)^2}} \times \cos(\beta) \qquad (1)$$

Both the flyback type PFC converter circuit and the boost type PFC converter circuit can force the input current to be in phase with the input voltage. Accordingly, the phase-shift β is not the main contributing factor in causing the flyback type PFC converter to have a poorer (e.g., lower) power factor. The experimental results shown in Table I support a conclusion that the reduction in power factor caused by input current distortion (e.g., THD) is much higher for a flyback type PFC converter in comparison to a boost type PFC converter.

SUMMARY

A need exists for improving (increasing) the power factor of a flyback type PFC converter by reducing the total harmonic distortion (THD) of the input current. As described herein, the THD is reduced by forcing the line current waveform to be closer to an ideal voltage waveform such that the current waveform is sinusoidal like the input voltage waveform.

One aspect in accordance with the embodiments disclosed herein is a zero current detector control circuit that controls a voltage applied to a zero current detector (ZCD) input of a power factor corrector integrated circuit (PFC IC) that produces a driver output having an on time and an off time. The zero current detector control circuit includes a voltage detection input circuit coupled to a rectified AC input voltage. The detector control circuit generates a control voltage applied to a control terminal of an electronic switch. When the rectified AC input voltage has a phase angle in a first portion or in a last portion of a half-cycle, the electronic switch conducts to connect a capacitor to the ZCD input of the PFC IC. The capacitor causes the fall time of the trailing edge of a pulse applied to the ZCD input to increase, which causes the off time of the driver output of the PFC IC to increase.

Another aspect of in accordance with the embodiments disclosed herein is a voltage control circuit for controlling a detection voltage applied to a zero current detector input of a power factor corrector integrated circuit in a power supply circuit. The power supply circuit receives a rectified AC input voltage having a time-varying magnitude referenced to a reference voltage. The power supply circuit includes a flyback transformer having a primary winding, a secondary winding and an auxiliary winding. The auxiliary winding is connected to the zero current detector input via a current limiting resistor. The voltage control circuit comprises an electronic switch having a first terminal connected to the zero current detector input of the power factor corrector integrated circuit. The electronic switch has a second terminal and has a control terminal. A capacitor is coupled between the second terminal of the electronic switch and a reference voltage. An input voltage detection circuit is connected to receive the AC input voltage and to apply a control voltage responsive to a magnitude of the AC input voltage to the control terminal of the electronic switch. The control voltage is selected to turn on the electronic switch for a first range of phase angles at the beginning each half-cycle of the AC input voltage and to turn on the electronic switch for a second range of phase angles at the end of each half-cycle of the AC input voltage. The electronic switch couples the capacitor to the zero current detector input to increase the fall times of the detection voltage when the AC input voltage is in either the first range of phase angles or the second range of phase angles.

In certain embodiments in accordance with this aspect, the input voltage detection circuit comprises a first resistor connected between a rectified AC input voltage terminal and a control node. The control node is connected to the control terminal of the electronic switch. A second resistor is connected between the control node and a voltage reference such that the control voltage on the control node is proportional to the magnitude of the rectified AC input voltage multiplied by a resistance of the second resistor and divided by a sum of the resistance of the second resistor and a resistance of the first resistor.

In certain embodiments in accordance with this aspect, the electronic switch comprises a PNP bipolar junction transistor. The first terminal of the electronic switch is an emitter terminal of the transistor. The second terminal of the electronic switch is a collector terminal of the transistor. The control terminal of the electronic switch is the base terminal of the transistor.

In certain embodiments in accordance with this aspect, the reference voltage is a circuit ground voltage.

In certain embodiments in accordance with this aspect, the detection voltage applied to the zero current detector input terminal of the power factor corrector integrated circuit is clamped by the integrated circuit at a maximum level. The detection voltage decreases from the maximum level to a threshold level when the secondary winding completes discharging. The detection voltage decreases from the maximum level at a first rate when the electronic switch is turned off when the rectified AC input voltage is not within either the first range of phase angles or the second range of phase angles. The detection voltage decreases from the maximum voltage level at a second rate when the electronic switch is turned on when the rectified AC input voltage is within either the first range of phase angles or the second range of phase angles, the second rate slower than the first rate.

Another aspect of in accordance with the embodiments disclosed herein is a zero current detector control circuit that controls a voltage applied to a zero current detector (ZCD) input of a power factor corrector integrated circuit (PFC IC). The zero current detector control circuit comprises a voltage detection input circuit configured to receive a rectified AC input voltage and to generate a control voltage at a control node. The control voltage is proportional to the instantaneous magnitude of the rectified AC input voltage. The instantaneous magnitude increases sinusoidally from a low magnitude to a peak magnitude during a first half of each half-cycle of the rectified AC input voltage and decreases to the low magnitude during a second half of each half-cycle of the AC input voltage. A capacitor has a first terminal and a second terminal. The second terminal of the capacitor is coupled to a voltage reference. An electronic switch has a control input, a first controlled terminal and a second controlled terminal. The control input of the electronic switch is coupled to the control node of the voltage detection input circuit. The first controlled terminal of the electronic switch is coupled to the ZCD input of the PFC IC. The second controlled terminal of the electronic switch is coupled to the first terminal of the capacitor. The electronic switch is responsive to the voltage on the control node being no greater than a threshold magnitude to turn on to couple the capacitor to the ZCD input of the PFC IC. The electronic switch is responsive to the voltage on the control node being greater than the threshold voltage to turn off to decouple the capacitor from the ZCD input of the PFC IC.

In certain embodiments in accordance with this aspect, the electronic switch comprises a PNP bipolar junction transistor. The first controlled terminal of the electronic switch is an emitter terminal of the transistor. The second controlled terminal of the electronic switch is a collector terminal of the transistor. The control input of the electronic switch is the base terminal of the transistor.

Another aspect of in accordance with the embodiments disclosed herein is a flyback type buck buck-boost converter. The converter comprises a converter input terminal that receives a rectified AC input voltage. The rectified AC input voltage has a time-varying magnitude with respect to a voltage reference. The converter further comprises a flyback transformer having a primary winding, a secondary winding and an auxiliary winding. The primary winding has a first terminal and a second terminal. The first terminal of the primary winding is coupled to the converter input terminal. An electronic switch has a first terminal, a second terminal and a control terminal. The first terminal of the electronic switch is connected to the second terminal of the primary winding of the flyback transformer. The second terminal of the electronic switch is connected to a voltage reference. The electronic switch turns on to enable current to flow through the primary winding of the flyback transformer. The electronic switch turns off to disable current flow through the primary winding of the flyback transformer and to cause current to discharge via the secondary winding of the transformer. A power factor corrector integrated circuit (PFC IC) has a switch control output terminal connected to the control terminal of the electronic switch. The PFC IC includes a current sense input coupled to receive a voltage proportional to a current through the primary winding of the flyback transformer. The PFC IC includes a multiplier input coupled to a multiplier input circuit to receive a voltage proportional to a magnitude of the rectified AC voltage. The PFC IC includes a zero current detector input that receives a zero current detector input voltage responsive to an auxiliary voltage across the auxiliary winding of the flyback transformer. The zero current detector input voltage comprises pulses, each pulse having a leading edge that occurs when the electronic switch turns off and having a trailing edge that occurs when the secondary winding of the transformer is discharged. The converter includes a trailing edge controller circuit having an input coupled to the converter input terminal to receive the rectified AC input voltage and having an output connected to the zero current detector input of the PFC IC. The trailing edge controller circuit is operable when the rectified AC input voltage has a magnitude within a range of magnitudes to increase the duration of the trailing edge of each pulse of the zero current detector input voltage that occurs during the time when the rectified AC input voltage has a magnitude within the range of magnitudes.

In certain embodiments in accordance with this aspect, the trailing edge controller circuit comprises a PNP bipolar junction transistor having an emitter, a collector and a base. The emitter of the transistor is connected to the zero current detector input of the PFC IC. A capacitor has a first terminal connected to the collector of the transistor and has a second terminal connected to a voltage reference. A voltage sensing network has an input terminal coupled to receive the rectified AC input voltage and has an output node that generates a voltage proportional to the instantaneous magnitude of the AC input voltage. The output node is connected to the base of the transistor. The transistor is operable in response to a voltage below a threshold voltage to turn on to electrically couple the first terminal of the capacitor to the zero current detector input.

BRIEF DESCRIPTIONS OF THE SEVERAL VIEWS OF THE DRAWINGS

Figure 1:
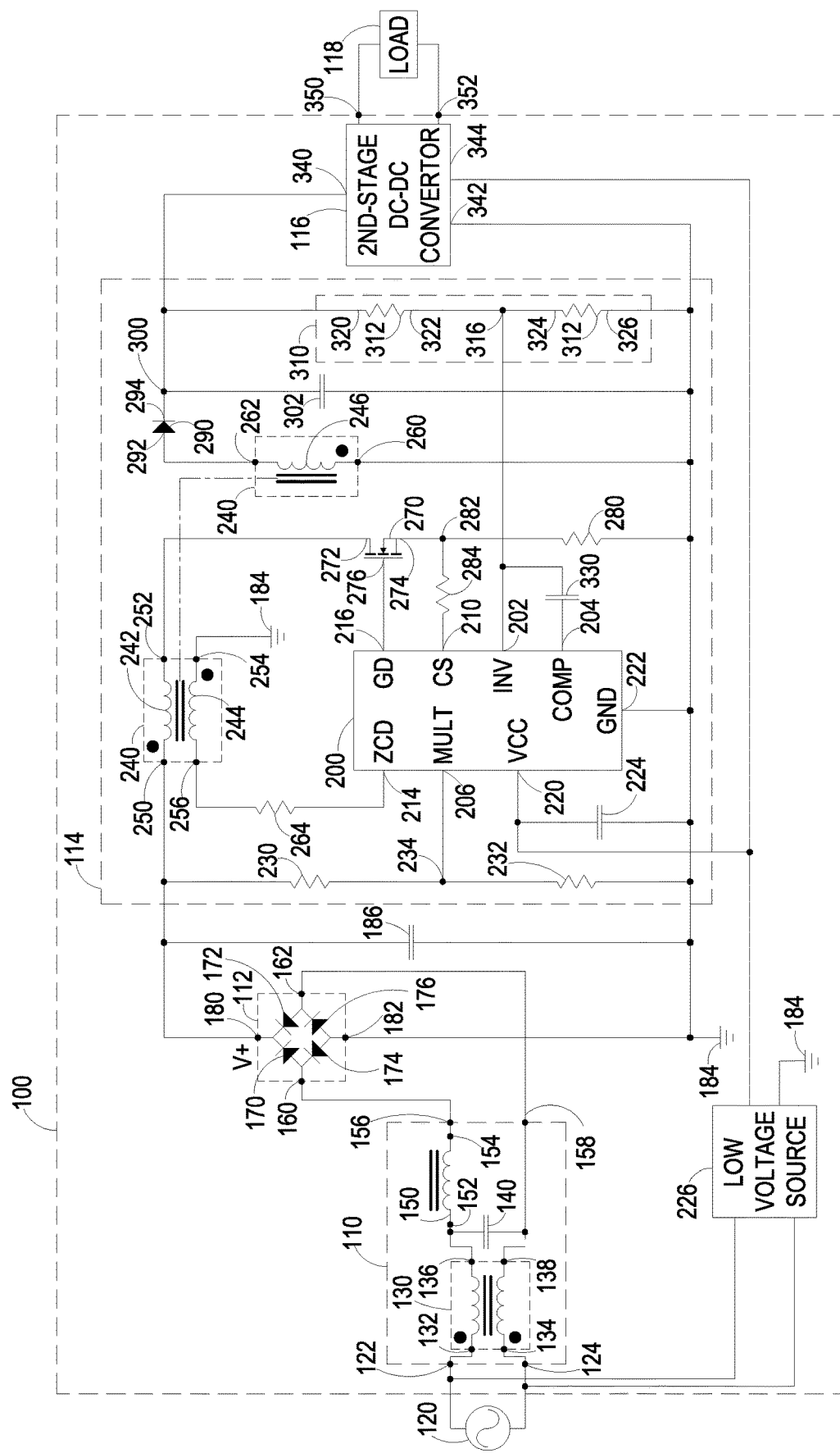
FIG. 1 illustrates a topology of a typical conventional two-stage electronic switching power supply, the power supply including a power factor corrector integrated circuit having a zero current detector (ZCD) input terminal and a multiplier (MULT) input terminal.
Figure 2A:
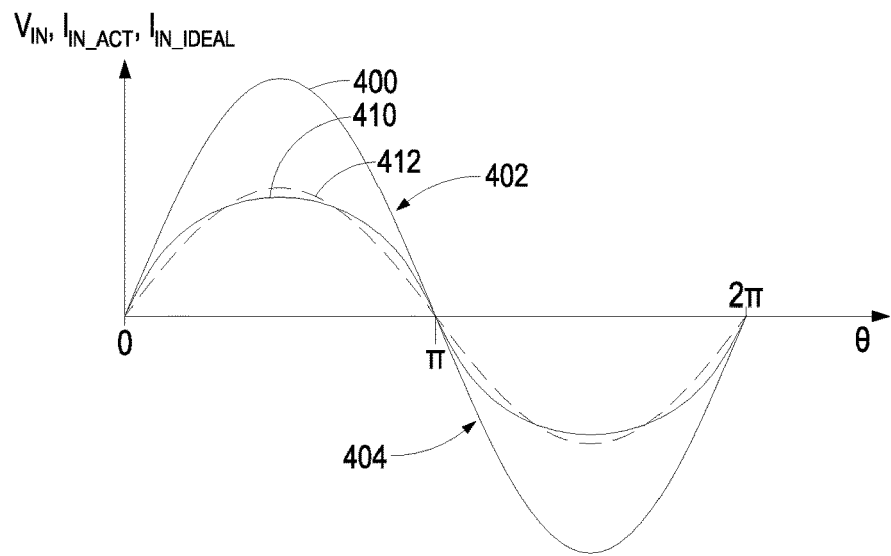
FIG. 2A illustrates first, second and third waveforms within the power supply circuit of FIG. 1, the first waveform representing an AC input voltage, the second waveform representing an actual input current, and the third waveform representing an ideal input current during a full cycle of the AC input voltage.
Figure 2B:
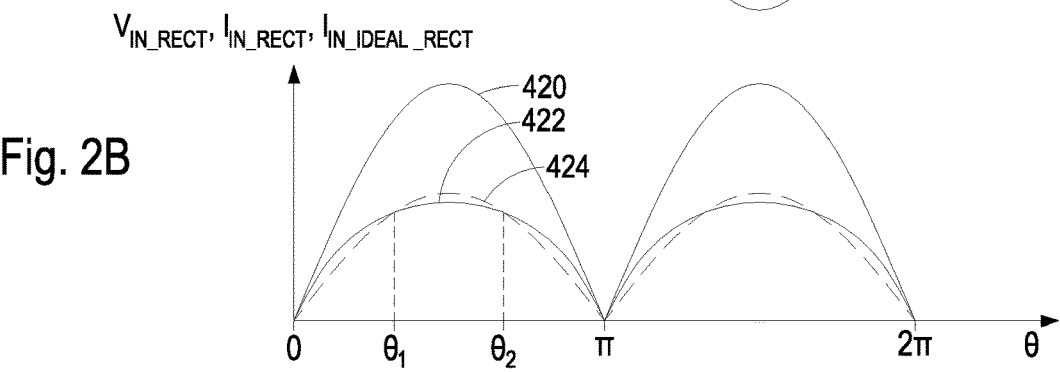

FIG. 2B illustrates first, second and third rectified waveforms within the circuit of FIG. 1, the first waveform representing the AC input voltage of FIG. 2A after rectification, the second waveform representing the actual input current of FIG. 2A after rectification, and the third waveform representing the ideal input current of FIG. 2A after rectification during a full cycle of the AC input voltage.

Figure 2C:
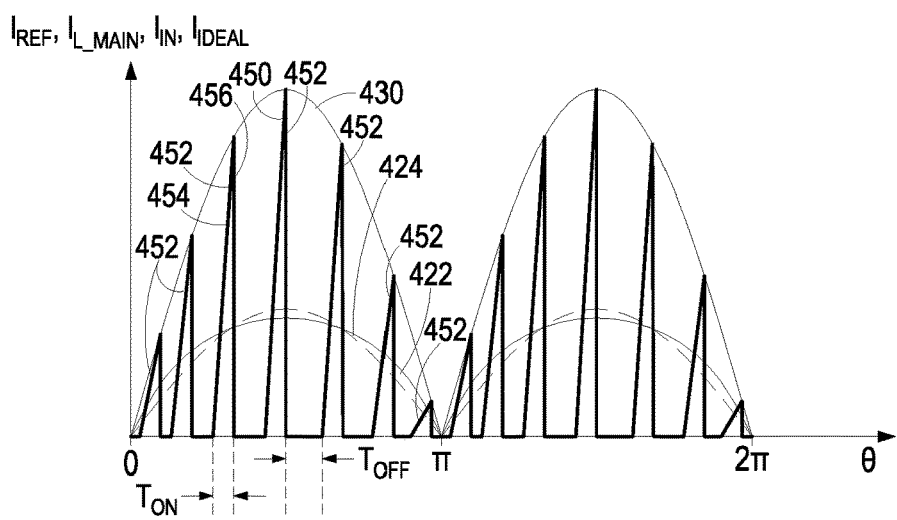

FIG. 2C illustrates first, second, third and fourth waveforms within the power supply circuit of FIG. 1, the first waveform representing a voltage on the multiplier input terminal of the power factor corrector integrated circuit, the second waveform representing the actual rectified AC current, the third waveform representing an ideal rectified AC current, and the fourth waveform representing the current in the primary winding of the flyback transformer in the power supply circuit during a full cycle of the AC input voltage.

Figure 2D:
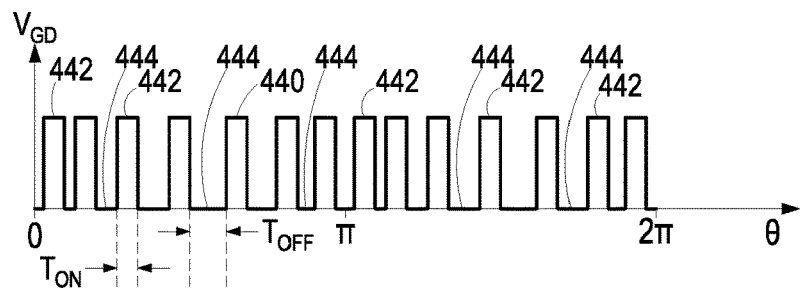

FIG. 2D illustrates a waveform representing the gate drive signal to an electronic switch in the power supply circuit of FIG. 1 during a full cycle of the AC input voltage.

Figure 3:
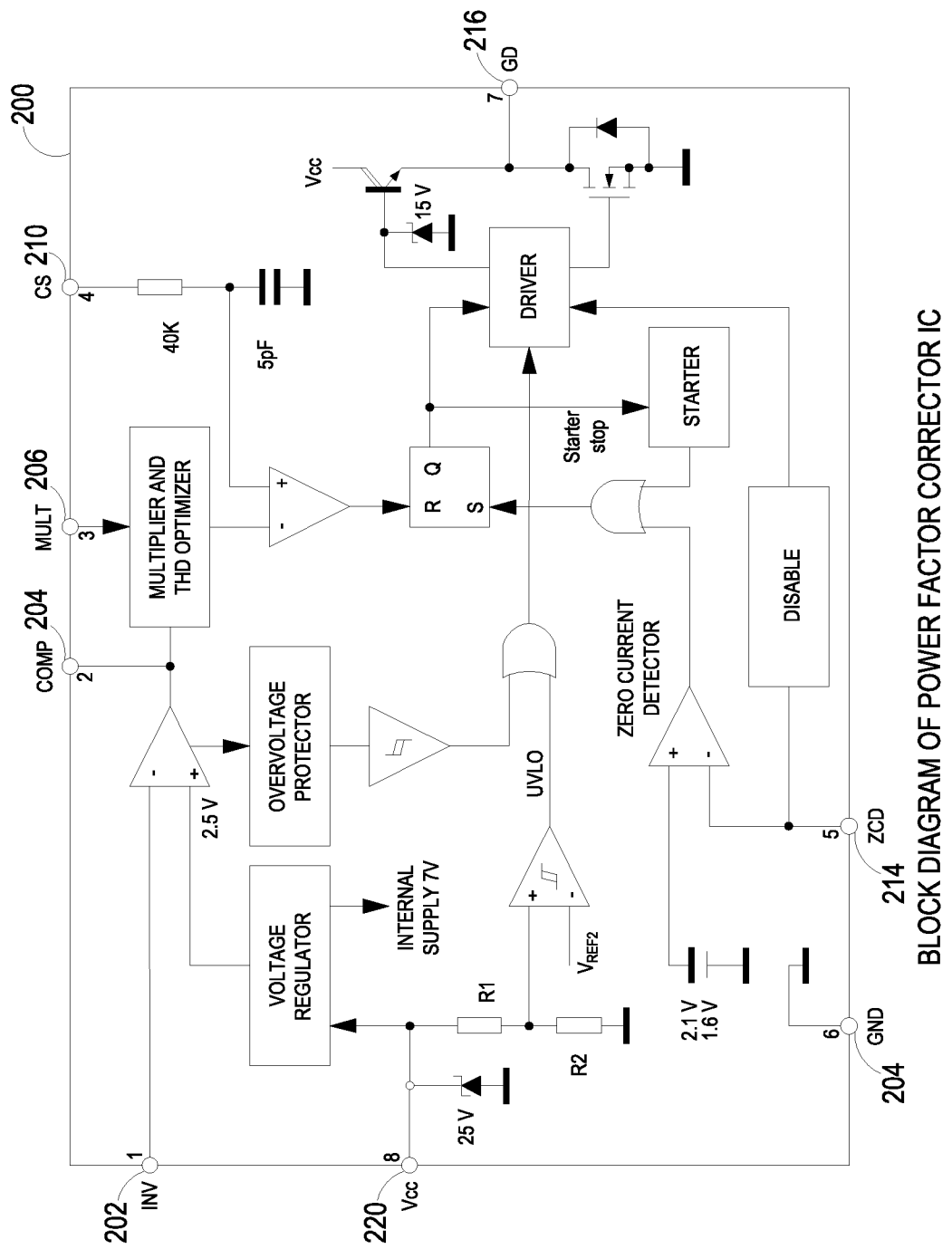

FIG. 3 illustrates a block diagram of the power factor corrector integrated circuit of FIG. 1.

Figure 4A:
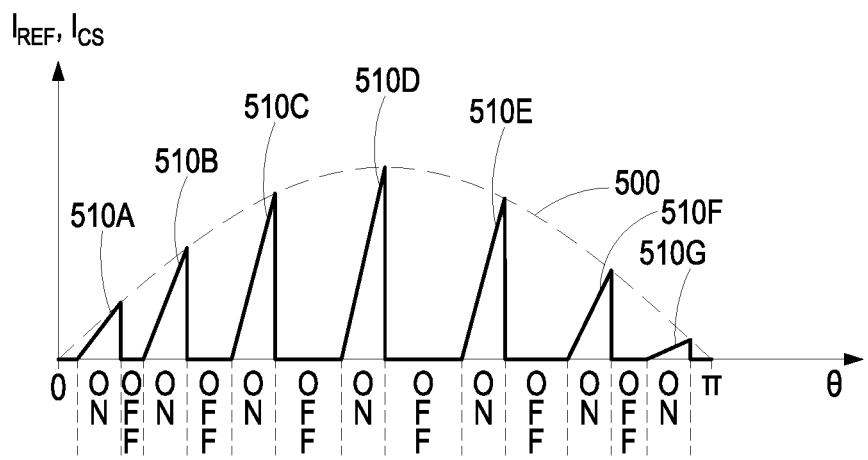

FIG. 4A illustrates a waveform representing the current in the primary winding of the flyback transformer during a single half-cycle of the AC input voltage.

Figure 4B:
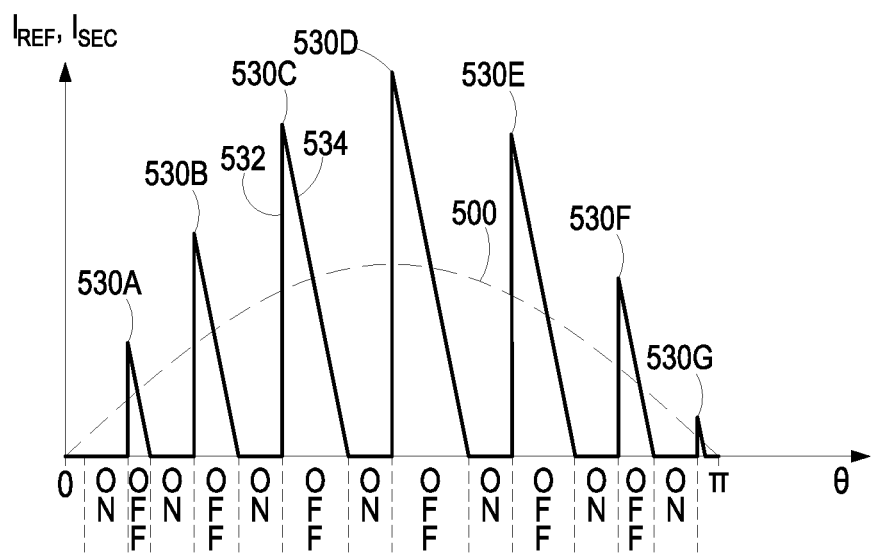

FIG. 4B illustrates a waveform representing the discharge current in the secondary winding of the flyback transformer during a single half-cycle of the AC input voltage.

Figure 4C:
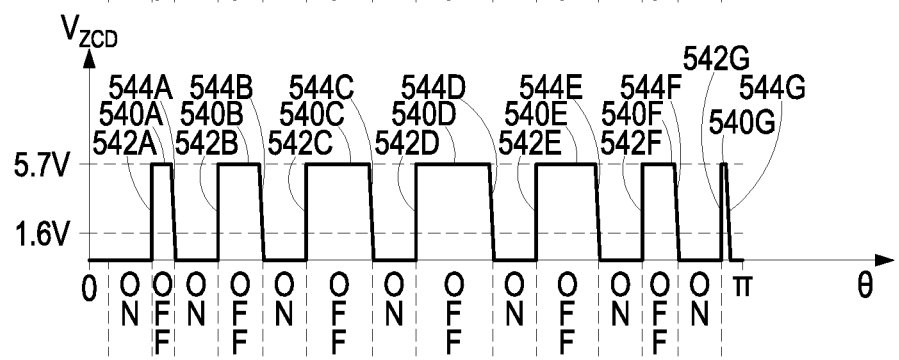

FIG. 4C illustrates a waveform representing the clamped auxiliary voltage (zero current detector input voltage) applied to the zero current detector input terminal of the power factor corrector integrated circuit of FIG. 1 during a single half-cycle of the AC input voltage.

Figure 4D:
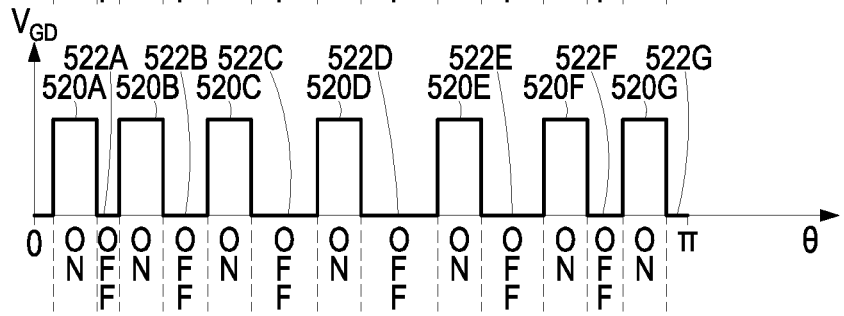

FIG. 4D illustrates a waveform representing the gate drive signal to an electronic switch in the power supply circuit of FIG. 1 during a single half-cycle of the AC input voltage.

Figure 5A:
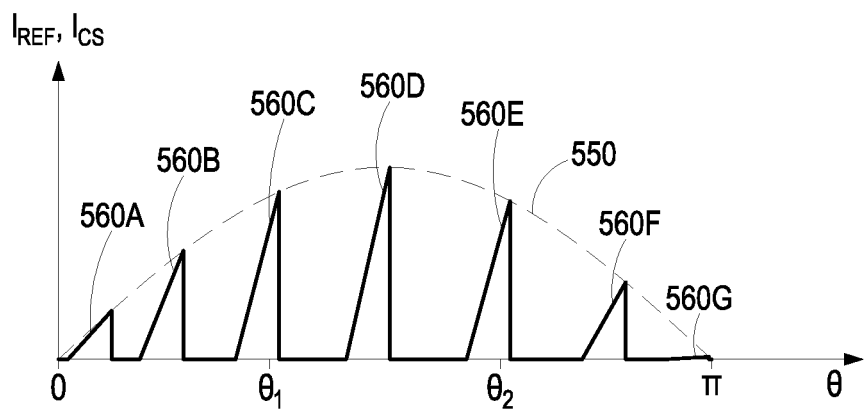

FIG. 5A illustrates a waveform representing the current in the primary winding of the flyback transformer during a single half-cycle of the AC input voltage, the waveform showing the modifications of selected off times to reduced total harmonic distortion.

Figure 5B:
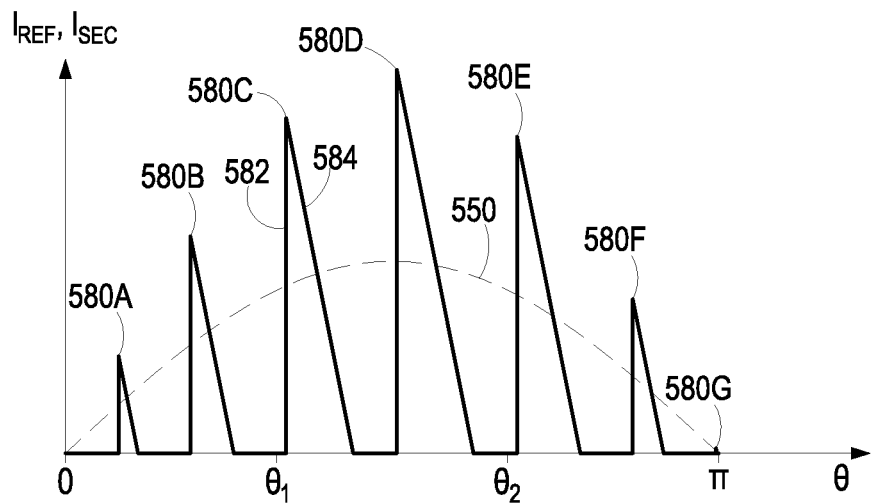

FIG. 5B illustrates a waveform representing the discharge current in the secondary winding of the flyback transformer during a single half-cycle of the AC input voltage.

Figure 5C:
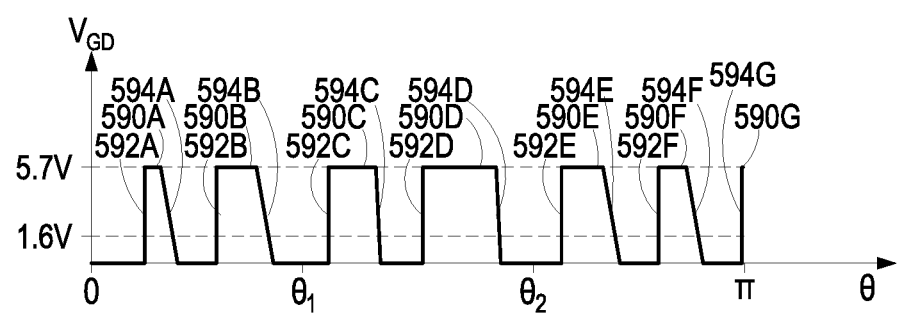

FIG. 5C illustrates a waveform representing the clamped auxiliary voltage applied to the zero current detector input terminal of the power factor corrector integrated circuit of FIG. 1 during a single half-cycle of the AC input voltage, the waveform showing increased fall times for the trailing edges of the clamped auxiliary voltage for the first two pulses near the beginning of the half-cycle and for the last two pulses near the end of the half-cycle.

Figure 5D:
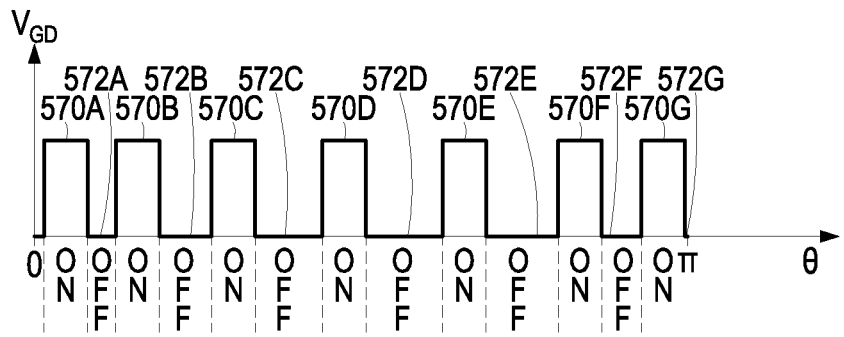

FIG. 5D illustrates a waveform representing the gate drive signal to show selected increased off times caused by the increased fall times of selected trailing edges of the pulses in FIG. 5C.

Figure 6A:
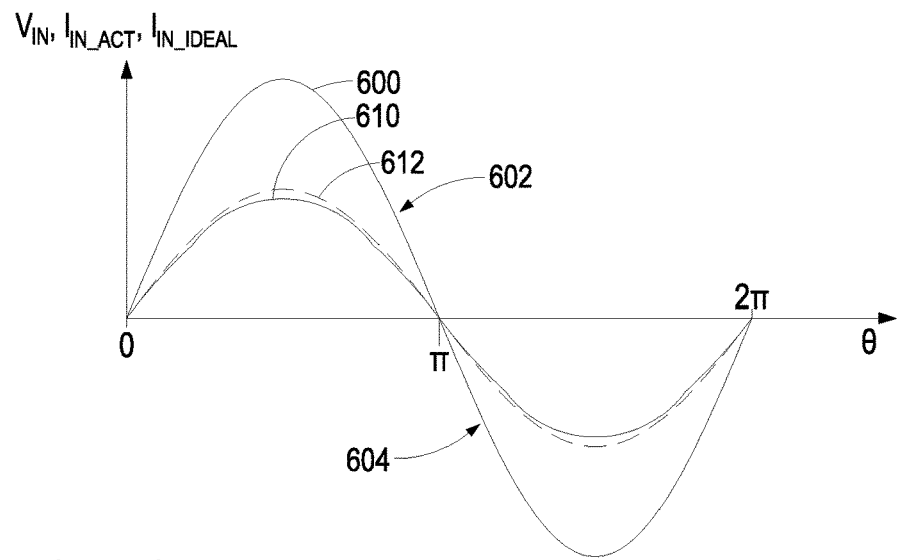

FIG. 6A illustrates first, second and third waveforms corresponding to the waveforms in FIG. 2A, wherein the actual current waveform is closer to sinusoidal than the corresponding actual current waveform in FIG. 2A such that total harmonic distortion is reduced.

Figure 6B:
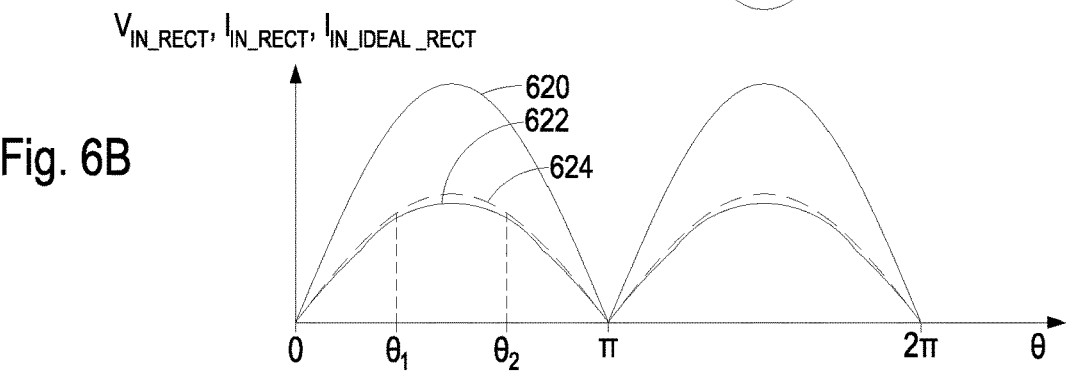

FIG. 6B illustrates first, second and third rectified waveforms, the first waveform representing the AC input voltage of FIG. 6A after rectification, the second waveform representing the actual input current of FIG. 6A after rectification, and the third waveform representing the ideal input current of FIG. 6A after rectification during a full cycle of the AC input voltage.

Figure 6C:
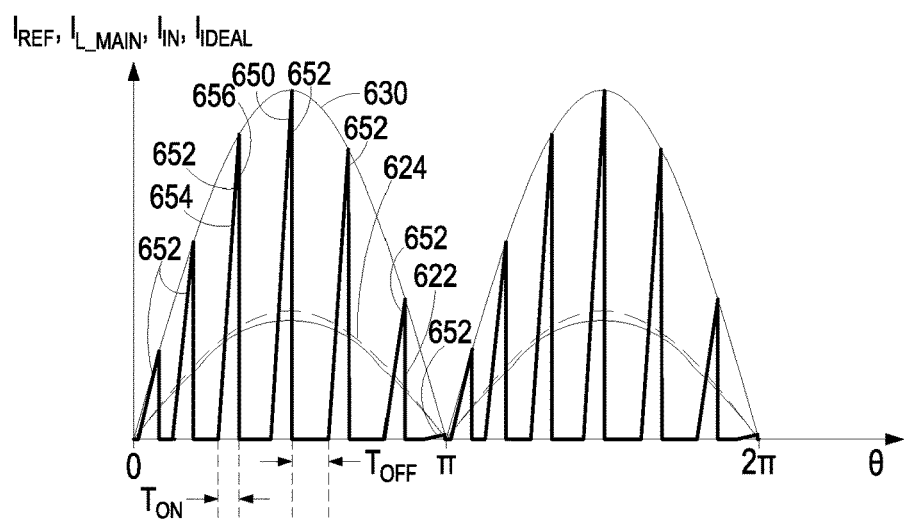

FIG. 6C illustrates first, second, third and fourth waveforms, the first waveform representing a voltage on the multiplier input terminal of the power factor corrector integrated circuit, the second waveform representing the actual rectified AC current, the third waveform representing an ideal rectified AC current, and the fourth waveform representing the current in the primary winding of the flyback transformer in the power supply circuit during a full cycle of the AC input voltage.

Figure 6D:
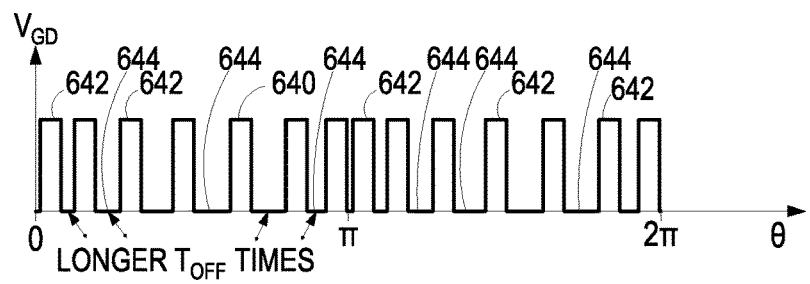

FIG. 6D illustrates a waveform representing the gate drive signal, the gate drive signal showing the increased off times between pulses near the beginning and near the end of each half cycle.

Figure 7:
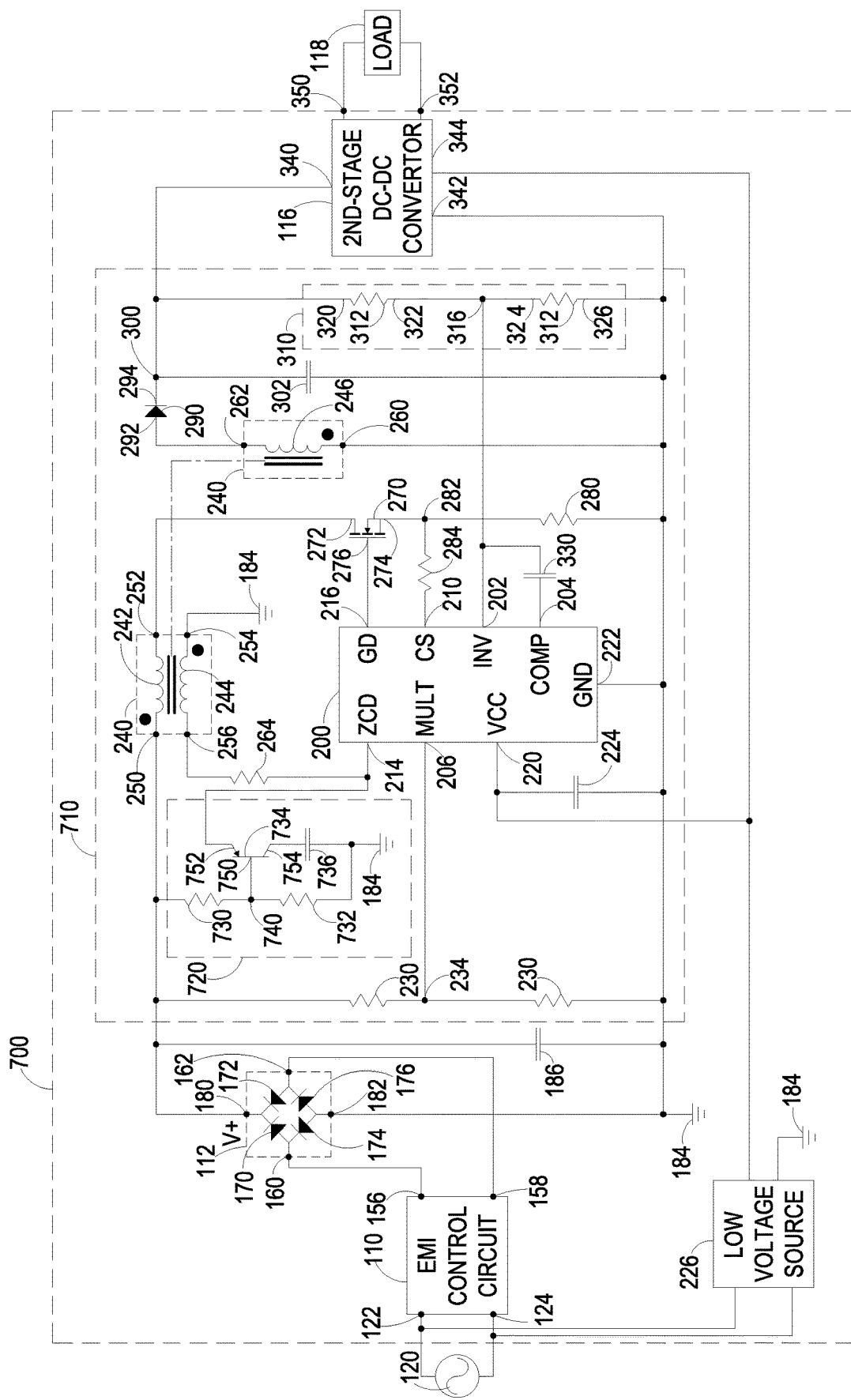

FIG. 7 illustrates an improved two-stage electronic switching power supply with a zero current detector (ZCD) trailing edge control circuit.

DETAILED DESCRIPTION

The following detailed description of embodiments of the present disclosure refers to one or more drawings. Each drawing is provided by way of explanation of the present disclosure and is not a limitation. Those skilled in the art will understand that various modifications and variations can be made to the teachings of the present disclosure without departing from the scope of the disclosure. For instance, features illustrated or described as part of one embodiment can be used with another embodiment to yield a still further embodiment.

The present disclosure is intended to cover such modifications and variations as come within the scope of the appended claims and their equivalents. Other objects, features, and aspects of the present disclosure are disclosed in the following detailed description. One of ordinary skill in the art will understand that the present discussion is a description of exemplary embodiments only and is not intended as limiting the broader aspects of the present disclosure.

FIG. 1 illustrates a topology of a typical conventional two-stage electronic switching power supply 100. The power supply includes four general blocks—an EMI control circuit 110, a rectifier circuit 112, a first-stage circuit 114 and a second-stage circuit 116. As described below, the first-stage circuit is a power factor correction (PFC) circuit. In the illustrated embodiment, the second stage circuit is a DC-DC convertor circuit. The second-stage circuit provides power to a DC load 118, which may be, for example, a plurality of interconnected light-emitting diodes (LEDs).

An AC source 120 provides AC power across a first (line) input 122 and a second (neutral) input 124 of the EMI control circuit 110. In particular, the line input is connected to a conventional line conductor of the AC source, and the neutral input is connected to a conventional neutral conductor of the AC source. The connections may be accomplished by hardwiring connections to the AC source or by inserting an AC plug into an AC outlet.

The EMI control circuit 110 comprises a common mode EMI choke 130 having a first input 132 connected to the line input 122 from the AC source 120 and having a second input 134 connected to the neutral input 124 from the source. The common mode EMI choke has a first output 136 and a second output 138. An X-type EMI filter capacitor 140 is connected between the first output and the second output of the common mode EMI choke. The first output of the common mode EMI choke is connected to a first terminal 152 of a differential mode EMI inductor 150. A second terminal 154 of the differential mode EMI inductor is connected to a first EMI circuit output terminal 156. The second output of the common mode EMI choke is connected to a second EMI circuit output terminal 158.

The AC power passes through the EMI control circuit 110 and is provided across a first input terminal 160 and a second input terminal 162 of the rectifier circuit 112. The rectifier circuit is configured as a full-wave bridge rectifier circuit that comprises a first rectifier diode 170, a second rectifier diode 172, a third rectifier diode 174, and a fourth rectifier diode 176, which are connected as shown.

The first input terminal 160 of the rectifier circuit 112 is connected to the anode of the first rectifier diode 170 and to the cathode of the third rectifier diode 174. The second input terminal 162 of the rectifier circuit is connected to the anode of the second rectifier diode 172 and to the cathode of the fourth rectifier diode 176.

The cathodes of the first rectifier diode 170 and the second rectifier diode 172 are commonly connected to a positive voltage (V+) output terminal 180 of the rectifier circuit 112. The anodes of the third rectifier diode 174 and the fourth rectifier diode 176 are commonly connected to a reference voltage output terminal 182, which is connected to a local circuit ground connection 184. A rectifier output filter capacitor 186 is connected between the positive voltage output terminal and the reference voltage output terminal of the rectifier circuit. The rectifier circuit generates a full-wave rectified output voltage across the rectifier output filter capacitor in a conventional manner.

The second-stage circuit ("PFC circuit") 114 in FIG. 1 is configured as a boost converter operating in the critical conduction mode. The PFC circuit includes a power factor corrector integrated circuit (PFC IC) 200. In the illustrated embodiment, the PFC IC comprises an L6562 PFC IC, which is commercially available from STMicroelectronics of Geneva, Switzerland. Other power factor corrector integrated circuits from the same manufacturer or from other manufacturers may also be incorporated into the PFC circuit.

The PFC IC 200 includes an inverting (INV) input 202 connected to an internal error amplifier. A compensation (COMP) output 204 is connected to an output of the internal error amplifier. A multiplier (MULT) input 206 is connected to an internal multiplier stage. A current sensing (CS) input 210 is connected to an internal comparator of an internal control loop. A zero current detection (ZCD) input 214 is connected to an internal zero current detector. A gate driver (GD) output 216 is connected to an internal push-pull output stage.

The PFC IC 200 further includes a supply voltage (VCC) input 220 that provides power to the IC. A ground return (GND) output 222 completes the power connection and provides a ground reference for signals received and generated by the IC. A voltage buffer capacitor 224 is connected between the supply voltage input and the ground return output. The supply voltage input is connected to a low voltage source 226 that provides the DC voltage for the operation of the PFC IC. In the illustrated embodiment, the low voltage source receives AC power from the AC source 120. In other embodiments, the low voltage source may be coupled to receive the rectified DC voltage produced by the rectifier circuit 112. For example, the low voltage source may include a linear voltage regulator that provides a substantially constant DC voltage over a wide range of input voltages. The low voltage source may also be a battery.

As further shown in FIG. 1, the PFC circuit 114 includes a first input voltage divider resistor 230 and a second input voltage divider resistor 232 connected in series between the positive reference voltage output terminal 180 of the rectifier circuit 112 and the local circuit ground connection 184. The two resistors are connected at a common node 234 to provide a voltage proportional to the time-varying output voltage from the rectifier circuit. The common node is connected to the multiplier (MULT) input 206 of the PFC IC 200. The PFC IC uses the input signal to control the timing of output signals to thereby control the power factor.

The PFC circuit 114 further includes a flyback transformer 240 having a main winding 242, a secondary winding 246 and an auxiliary winding 244. The main winding, which also may be referred to as the primary winding, has a first terminal 250 and a second terminal 252. The auxiliary winding has a first terminal 254 and a second terminal 256. The secondary winding has a first terminal 260 and a second terminal 262. As noted by the dot convention on the windings, the three windings are mutually coupled, and the respective first terminals of the three windings are in phase.

The first terminal 250 of the main winding of the flyback transformer 240 is connected to the positive reference voltage output terminal 180 of the rectifier circuit 112.

The second terminal 252 of the main winding 240 of the flyback transformer 240 is connected to a drain terminal 272 of an electronic switch 270. In the illustrated circuit, the electronic switch comprises an n-channel enhancement mode metal oxide semiconductor field effect transistor (MOSFET). The electronic switch also has a source terminal 274 and a gate terminal 276. The gate terminal of the electronic switch is connected to the gate drive (GD) output 216 of the PFC IC 200. The source terminal of the electronic switch is connected to a first terminal of a current sensing resistor 280 at a current sensing node 282. A second terminal of the current sensing resistor is connected to the local circuit ground connection 184.

The current sensing resistor 280 has a low resistance of, for example, 0.1 ohm such that the current flowing through the current sensing resistor generates a voltage on the current sensing node 282 that is proportional to the magnitude of the current. The voltage generated on the current sensing node is coupled to the current sensing (CS) input 210 of the PFC IC 200 via a current sensing input resistor 284.

When the gate drive output of the PFC IC 200 is active and the electronic switch 270 is closed (e.g., the electronic switch is conducting), current flows through the main winding 242 of the flyback transformer 240 to charge the windings of the flyback transformer. The current increases at a rate (e.g., slope) determined by the voltage across the flyback transformer (e.g., the voltage of the positive reference voltage output terminal 180 of the rectifier circuit 112) and by the inductance and resistance in the series connection from the positive voltage output terminal through the main winding and through the electronic switch to the local circuit ground connection 184.

The first terminal 254 of the auxiliary winding 244 of the flyback transformer 240 is connected to the local circuit ground connection 184. The second terminal 256 of the auxiliary winding of the flyback transformer is connected to a first terminal of a current limiting resistor 264. A second terminal of the current limiting resistor is connected to the zero current detection (ZCD) input 214 of the PFC IC 200. When current is flowing from the first terminal 250 to the second terminal 252 of the main winding 240 of the flyback transformer 240, a negative voltage develops on the secondary terminal of the auxiliary winding with reference to the first terminal connected to the ground reference. Internal circuitry within the PFC IC clamps the ZCD input such that the ZCD input remains at zero volts with respect to the ground reference while the current is flowing through the main winding. Accordingly, a current flows from the second terminal of the auxiliary winding through the current limiting resistor to the ZCD input of the PFC IC when current is increasing in the main winding.

The first terminal 260 of the secondary winding 246 of the flyback transformer 240 is connected to the local circuit ground reference 184. The second terminal 262 of the secondary winding is connected to an anode 292 of a PFC circuit output diode 290. A cathode 294 of the PFC circuit output diode is connected to a PFC circuit output node 300. As described below, a PFC circuit output voltage ($V_{PFC\_OUT}$) is produced on the PFC circuit output node.

A PFC circuit output filter capacitor 302 is connected between the PFC circuit output node 300 and the local circuit ground connection 184 to filter the PFC circuit output voltage. In the illustrated embodiment, the PFC circuit output filter capacitor is an electrolytic capacitor.

The two-stage electronic switching power supply 100 includes a voltage sensing circuit 310 connected across the PFC circuit output filter capacitor 302 between the PFC circuit output node 300 and the local circuit ground connection 184. The voltage sensing circuit includes a first voltage sensing resistor 312 and a second voltage sensing resistor 314, which are connected in series between the PFC circuit output node and the local circuit ground connection. The first voltage sensing resistor is connected between the PFC circuit output node and a voltage sensing node 316. A first terminal 320 of the first voltage sensing resistor is connected to the PFC circuit output node. A second terminal 322 of the first voltage sensing resistor is connected to the voltage sensing node. The second voltage sensing resistor is connected between the voltage sensing node and the local circuit ground reference. A first terminal 324 of the second voltage sensing resistor is connected to the voltage sensing node. A second terminal 326 of the second voltage sensing resistor is connected to the local circuit ground reference.

A sensed voltage ($V_{SENSE}$) is produced on the voltage sensing node 316. The voltage sensing node is connected to the inverting (INV) input 202 of the PFC IC 200 to provide feedback to the PFC IC proportional to the PFC circuit output voltage. The PFC IC is responsive to the sensed voltage at the voltage sensing node to regulate the voltage on the PFC circuit output node. For example, the resistance values of the first voltage sensing resistor 312 and the second voltage sensing resistor 314 are selected to cause the sensed voltage at the voltage sensing node to be 2.5 volts when the PFC circuit output voltage ($V_{PFC\_OUT}$) on the PFC circuit output node has a selected magnitude. If the PFC circuit output voltage increases above the selected magnitude, the PFC IC adjusts the timing of the signal applied to the gate terminal of the electronic switch to reduce the PFC circuit output voltage. If the PFC circuit output voltage decreases below the selected magnitude, the PFC IC adjusts the timing of the signal applied to the gate terminal of the electronic switch to increase the PFC circuit output voltage.

A feedback compensation capacitor 330 is connected between the compensation (COMP) output 204 and the inverting (INV) input 202 of the PFC IC 200. The feedback compensation capacitor is connected as part of an integration control loop of the PFC IC. The integration control loop of the PFC IC operates to stabilize the output voltage on the PFC circuit output node 300.

The operation of the PFC circuit 114 is well known. Basically, the PFC IC 200 controls the timing of the gate voltage of the electronic switch 270 to selectively turn the electronic switch on and off. The PFC IC compares the sensed voltage ($V_{SENSE}$) applied to the inverting (INV) input 202 from the voltage sensing node 316 to an internal reference voltage (e.g., 2.5 volts in the illustrated embodiment). The PFC IC modifies the timing of the gate drive signal from the gate drive (GD) output 216 to maintain the PFC circuit output voltage at a desired voltage level to thereby cause the sensed voltage to be equal to the internal reference voltage.

The PFC IC 200 monitors the current through the electronic switch 270 via a voltage on the current sensing (CS) input from the current sensing node 282. The PFC IC controls the electronic switch to control the magnitude of the current to conform with a magnitude envelope corresponding to the time-varying magnitude of the voltage on the multiplier (MULT) input 206. In the critical conduction mode of operation, after the PFC IC turns the electronic switch off, the PFC IC does not turn the electronic switch on until the discharge current in the auxiliary winding 244 of the flyback transformer 240 is close to zero as determined by the current flowing into the zero current detection (ZCD) input 214.

When the electronic switch 270 is turned on, current flows from the positive reference voltage output terminal 180 of the rectifier circuit 112 through the main winding 242 of the flyback transformer 240 in the direction from the first terminal 250 to the second terminal 252 of the main winding. The current flows through the electronic switch to the local circuit ground connection 184. The current develops a magnetic charge in the windings of the flyback transformer. The voltage across the main winding from the first terminal to the second terminal of the main winding causes a voltage across the secondary winding 246 from the first terminal 260 to the second terminal 262 of the secondary winding and causes a voltage across the auxiliary winding 244 from the first terminal 254 to the second terminal 256 of the auxiliary winding. As discussed above, the resulting negative auxiliary voltage on the second terminal of the auxiliary winding causes a current to flow through the current limiting resistor 264 from the clamped ZCD input 214 of the PFC IC.

When current is flowing through the main winding 242 of the flyback transformer 240 as described above, the voltage on the second terminal 262 of the secondary winding 246 is negative with respect to the local circuit ground connection 184. This causes the PFC circuit output diode 290 to be reverse biased such that no current flows through the secondary winding when current is flowing through the main winding.

When the electronic switch 270 is turned off, current can no longer flow through the main winding 242 of the flyback transformer 240; and the magnetic charge in the flyback transformer must discharge through the secondary winding 246 and the auxiliary winding 244. The main discharge path is via the PFC circuit output diode 290. The decreasing current flow as the flyback transformer discharges causes a voltage to develop from the second terminal 240 to the first terminal 242 that is opposite to the voltage when the flyback transformer was charging when the electronic switch was turned on. Accordingly, the PFC circuit output diode is forward biased. The current flows through the PFC circuit output diode to the PFC circuit output node 300 to charge the PFC circuit output filter capacitor 302.

The output voltage ($V_{PFC\_OUT}$) from the PFC circuit 114 on the PFC circuit output node 300 is provided to a high voltage input terminal 340 of the DC-DC converter circuit 116. The DC-DC converter circuit has a ground terminal 342 connected to the local circuit ground connection 184. The DC-DC converter circuit has a component supply voltage terminal 344, which is connected to the output of the low voltage source 226. The output voltage is also provided as a feedback (sensed) signal to the PFC IC via the voltage sensing circuit 310 as described above.

The DC-DC converter circuit 116 operates in a conventional manner to convert the unregulated DC voltage on the high voltage input terminal 340 to a regulated DC voltage between a first output terminal 350 and a second output terminal 352 to drive the load 118. In an exemplary DC-DC converter circuit for supplying a plurality of LEDs, the DC-DC converter circuit controls the magnitude of the current flowing through the LEDs to maintain a selected illumination level of the LEDs in the load. For example, the DC-DC converter in the illustrated embodiment may be a switch-mode power supply, which is configured to provide a substantially constant current to the load. The switch-mode power supply operates by generating a high frequency switched DC signal having a variable duty cycle or a variable pulse width. The duty cycle or pulse width of the switched DC signal is controlled via feedback techniques to generate a selected output current.

The on time ($T_{ON}$) of the gate drive signal generated on the gate drive (GD) output 216 of the PFC IC 200 and applied to the gate terminal 276 of the electronic switch 270 is determined by the multiplier signal on the multiplier (MULT) input 206 of the PFC IC. The on time is also determined by the input voltage $V_{IN}$ applied to the first terminal 250 of the main winding 242 of the flyback transformer 240. For the illustrated embodiment incorporating the L6562 PFC IC from STMicroelectronics, it can be shown that $T_{ON}$ can be determined from the inductance ($L_{MAIN}$) of the main winding, the peak input voltage ($V_{IN\_PEAK}$), and the peak multiplier voltage ($V_{MULTI\_PEAK}$) in accordance with the following equation:

$$T_{ON} = L_{MAIN} \times G \times \frac{V_{MULT\_PEAK}}{V_{IN\_PEAK}} \qquad (2)$$

In Equation (2), the inductance $L_{MAIN}$ is constant. The parameter G is a constant determined by the relationship of the sensed inductor current and the multiplier voltage within the PFC IC 200. As shown in Equation (2), the on time $T_{ON}$ is constant throughout each half-cycle and is not a function of the phase angle.

In contrast to the constant on time, the off time ($T_{OFF}$) changes with respect to the phase angles within each half cycle of the input voltage. The off time changes because the magnetic charge developed within the flyback transformer 240 when the electronic switch 270 is on must discharge through the secondary winding 246 when the electronic switch is turned off. It can be shown that $T_{OFF}$ varies with the phase angle (θ) and the selected magnitude of the output voltage ($V_{OUT}$) in accordance with the following equation:

$$T_{OFF} = L_{MAIN} \times G \times \frac{V_{MULT\_PEAK} \times |\sin(\theta)|}{n \times V_{OUT}} \qquad (3)$$

In Equation (3), "n" is the turns ratio between the main winding 242 and the secondary winding 246 of the flyback transformer 240.

As shown in Equation (3), TOFF increases from the beginning of each half cycle of the input voltage to the midpoint of each half cycle (θ=90 degrees or π/2 radians) and then decreases to the end of the half cycle. The average current through the main winding 242 of the flyback transformer 240 for one switch cycle that occurs at each phase angle (θ) can be defined in accordance with the following equation:

$$I_{AVG} = \frac{1}{2} \times I_{PEAK} \times \sin(\theta) \times \frac{T_{ON}}{T_{ON} + T_{OFF}(\theta)} = \\ \frac{1}{2} \times k \times V_{MULT} \times \sin(\theta) \times \frac{T_{ON}}{T_{ON} + T_{OFF}(\theta)} \qquad (4)$$

FIGS. 2A-2D illustrate the relationships between the switch on times, the switch off times, the input voltage waveform, the ideal input current waveform, the actual input current waveform, the reference current waveform, the switched current waveforms, the ideal average inductor current waveform and the actual average inductor current waveform.

In FIG. 2A, a voltage waveform 400 represents the input voltage $V_{IN}$ over a full cycle comprising a first half-cycle 402 between a phase angle of 0 and a phase angle of π radians (180 decrees) and a second half-cycle 404 between a phase angle of π radians and a phase angle of 2π (360 degrees) A current waveform 410 represents an actual input current waveform $I_{IN\_ACT}$ over the full cycle. A current waveform 412 (shown as a dashed line) represents an ideal input current waveform $I_{IN\_IDEAL}$ over the full cycle. The voltage waveform is substantially sinusoidal. The ideal input current waveform is also substantially sinusoidal and is in phase with the input voltage. The actual input current waveform is also in phase with the input voltage; however, as described below, the actual input current is distorted because of total harmonic distortion (THD) caused by the conventional two-stage electronic switching power supply 100 illustrated in FIG. 1. As described above with respect to Equation (1), the THD causes a reduction in the power factor of the conventional two-stage electronic switching power supply.

The input voltage $V_{IN}$ is rectified by the rectifier circuit 112 such that the rectified input voltage $V_{IN\_RECT}$ on the positive reference voltage output terminal 180 appears as two substantially identical positive half cycles as represented by a waveform 420 in FIG. 2B. The actual rectified input current $I_{IN\_ACT\_RECT}$ is represented by a waveform 422 in FIG. 2B. The rectified ideal input current $I_{IN\_IDEAL\_RECT}$ is represented by a waveform 424 (shown as a dashed line) in FIG. 2B. Each current waveform appears as two respective substantially identical half-cycles in FIG. 2B.

As illustrated in FIG. 2B, the ideal rectified input current waveform 424 is substantially sinusoidal and is in phase with the rectified input voltage waveform 420. In contrast, the actual rectified input current waveform 422 illustrates the effect of THD on the current waveform. Although the actual rectified current waveform is in phase with the voltage input voltage waveform, the actual rectified input current waveform is not sinusoidal. Rather, the actual rectified input current waveform has an initial portion at phase angles near the beginning of the first half cycle in which the actual rectified input current waveform increases faster than the ideal rectified input current waveform. As the phase angle increases, the rate of increase of the actual input current waveform becomes lower than the rate of increase of the ideal rectified input current waveform. The lower rate of change of the actual rectified input current waveform continues through a middle portion of the waveform. After the midpoint of the half cycle, the actual rectified input current waveform decreases at a slower rate than the ideal rectified input current waveform until near the end of the half cycle when the actual input current waveform starts to decrease at a greater rate than the ideal rectified input current waveform. The corresponding differences in the rates of change of the two waveforms are repeated in the second half cycle.

The differences in the rates of change of the two waveforms causes the actual input current waveform 424 to have a greater magnitude than the ideal input current waveform 422 near the beginning and near the end of each half cycle. Furthermore, the actual input current waveform has a lower magnitude in the middle portion of each half cycle. This causes the actual input current waveform to have a flattened ("pushed-down") appearance in comparison to the true sinusoidal ideal input current waveform. This flattened appearance results from THD. THD also reduces the power factor as described above with respect to Equation (1). In the illustrated example, the actual current waveform is greater than the ideal current waveform at phase angles between 0 and $\theta_1$. The actual current waveform is less than the ideal current waveform at phase angles between $\theta_1$ and $\theta_2$. The actual current waveform is greater than the ideal current waveform at phase angles between $\theta_2$ and $\pi$. The differences between the actual current waveform and the ideal current waveform are repeated in the second half cycle. In the illustrated example, a first difference in phase angle between 0 and $\theta_1$ and a second difference between $\theta_2$ and $\pi$ are equal or substantially equal. For example, in one embodiment, the phase angle $\theta_1$ may be approximately 29 degrees, and the phase angle $\theta_2$ may be approximately 151 degrees (approximately 29 degrees before the end of the half cycle).

The foregoing effect can be shown to be related to the on times and the off times of the electronic switch 270 in FIG. 1. As shown in FIG. 2C, a waveform 430 represents a reference current ($I_{REF}$) magnitude within the PFC IC 200 to which the sensed current on the current sense (CS) input 210 is compared to determine when to turn of the gate drive. As described above, the reference current magnitude is determined by multiplying the multiplier input voltage on the $V_{MULT}$ input 206 by the error signal generated within the PFC IC. As illustrated by a gate drive (GD) waveform 440 in FIG. 2D, the PFC IC turns on the gate drive with a plurality of positive pulses 442 to turn on the electronic switch to enable current to flow through the main winding 242 of the flyback transformer 240. In FIG. 2D, each positive pulse 442 represents the on time ($T_{ON}$) of the electronic switch. Each positive pulse is followed by a respective zero voltage level 444, which represents an off time ($T_{OFF}$) of the electronic switch. When the error signal within the PFC IC is not changing, the on times of the electronic switch are substantially constant as illustrated in FIG. 2D. On the other hand, the off times between the on times vary throughout each half cycle. The off times are greater near the middle of each half-cycle and are smaller near the beginning and the end of each half-cycle.

The current through the main winding 242 of the flyback transformer 240 is represented by a discontinuous winding current waveform 450 in FIG. 2C. The winding current waveform comprises a plurality of current pulses 452. Each current pulse comprises an increasing leading edge 454 and a decreasing trailing edge 456. Each leading edge increases at a rate determined by the instantaneous magnitude of the rectified input voltage at the positive reference voltage output terminal 180 of the rectifier circuit 112 when the electronic switch is turned to apply the rectified input voltage across the main winding of the flyback transformer. The instantaneous magnitude of the voltage across the main winding increases sinusoidally from a substantially zero value at the beginning of each cycle (e.g., at 0 degrees or 0 radians) to a peak value in the middle of the cycle (e.g., at 90 degrees or $\pi/2$ radians), and then decreases sinusoidally from the middle of the cycle to a substantially zero value at the end of the cycle (e.g., at 180 degrees or it radians).

As the rectified input voltage increases at increasing phase angles during the first half of the first half cycle, the rate of change of the leading edges of the current pulses increases. Furthermore, as the rectified input voltage increases, the magnitude of the reference current waveform also increases because the multiplier voltage on the multiplier (MULT) input 206 of the PFC IC 200 increases proportionally to the rectified input voltage. In accordance with Equation (2), the time required for the winding current to reach a maximum magnitude corresponding to the reference current waveform at each phase angle is substantially the same for each phase angle when the error signal generated within the PFC IC is not changing.

As further illustrated by the discontinuous main winding current waveform 450 in FIG. 2, the trailing edge 456 of each current pulse 452 decreases without substantial delay because the electronic switch 270 disconnects the main winding 242 of the flyback transformer 240 from the circuit. As described above, the magnetic charge produced in the flyback transformer is discharged via the secondary winding 246. The timing of the discharge is described below.

As discussed above, the current in the secondary winding 246 is zero when the current is flowing in the main winding 242 when the electronic switch 270 is on. When the electronic switch turns off such that current can no longer flow in the main winding, the flyback transformer begins to discharge through the secondary winding 246 and the auxiliary winding 244. The decreasing magnitudes of the discharge currents cause the polarities of the windings to reverse. The PFC circuit output diode 290 is now forward biased, and the current flows out of the secondary winding and through the PFC circuit output diode to charge the PFC circuit output filter capacitor 302. In accordance with Equation (3), the time required to discharge the flyback transformer through PFC circuit output diode varies with the phase angle ($\theta$) of the line voltage. Near the beginning and the end of each half-cycle, the discharge time, which is the $T_{OFF}$ time of the circuit, is relatively small. As the phase angle increases to 90 degrees ($\pi/2$), the discharge time increases. The discharge time then decreases as the phase angle continues to increase to 180 degrees ($\pi$). The increased $T_{OFF}$ time in the middle range of phase angles causes the decreased actual line current 422 in the middle range of phase angles as shown in FIGS. 2B and 2C, which results in the increased THD.

A need exists to reduce the THD. As suggested by Equation (4), if the $T_{OFF}$ time can be forced to be constant, then the $T_{ON}/(T_{ON}+T_{OFF}(\theta))$ portion of Equation (4) is a constant such that the average current $I_{AVG}$ of the main winding 242 of the flyback transformer 240 will have a sinusoidal shape.

To obtain a perfect sinusoidal input current waveform, $T_{OFF}$ could be forced to always be equal to the maximum off time $T_{OFF\_MAX}$ of the electronic switch 270 of FIG. 1 at the peak of the input line voltage at $\theta=90$ degrees ($\pi/2$) where $\sin(\theta)=1$. By forcing the off time to be a constant duration corresponding to the maximum off time, Equation (3) can be rewritten as:

$$T_{OFF\_MAX} = L_{MAIN} \times G \times \frac{V_{MULT\_PEAK}}{n \times V_{out}} \quad (5)$$

In Equation (5), the off time is no longer a function of the phase angle.

Substituting $T_{OFF\_MAX}$ for $T_{OFF}(\theta)$ in Equation (4) results in:

$$I_{AVG} = \frac{1}{2} \times k \times V_{MULT} \times \sin(\theta) \times \frac{T_{ON}}{T_{ON} + T_{OFF\_MAX}} \quad (6)$$

Forcing the off time to be constant is not feasible using the L6562 PFC IC 200 described above. The control circuitry within the PFC IC causes the PFC IC to operate with a constant on time and with a variable off time as described above. Although a constant off time cannot be achieved, the circuitry and the method described below can dynamically increase the off times in certain portions of each half-cycle of the input voltage to increase the shorter off times to durations closer to the longer off times. Increasing the duration of the shorter off times results in the input current waveform having a shape closer to the ideal sinusoidal waveform shape and thus results in a reduced THD.

As shown in FIGS. 2A, 2B and 2C, the actual current waveform has greater magnitudes in each half-cycle when the phase angle $\theta$ is less than $\theta_1$ and when the phase angle is greater than $\theta_2$. As described below, increasing the off times when the phase angle $\theta$ is less than $\theta_1$ and when the phase angle is greater than $\theta_2$ in each half-cycle will decrease the average line current during those portions of the half-cycle and will modify the actual current waveform to a waveform closer to the ideal sinusoidal waveform.

As indicated above, the PFC IC 200 operates with a fixed on time ($T_{ON}$) and a variable off time ($T_{OFF}$). The operation of the PFC IC is illustrated with respect to the internal block diagram of the L6562 PFC IC shown in FIG. 3. The block diagram is reproduced from the datasheet provided by the manufacturer of the PFC IC.

The PFC IC 200 regulates the current through the main winding 242 of the flyback transformer 240 by sensing the current through the current sensing resistor 280 of FIG. 1. A voltage ($V_{I\_SENSED}$) proportional to the sensed current is applied to the CS input 210 of the PFC IC.

The voltage feedback signal provided to the INV input 202 is applied to an inverting input of a first internal differential amplifier having a reference voltage (e.g., 2.5 volts) on a non-inverting input. The output of the differential amplifier is an error signal that is provided as one input of a multiplier. The multiplier voltage from the common node 234 is applied to a second input of the multiplier via the MULTI input 206. The output of the multiplier is an internal reference voltage $V_{I\_REF}$, which represents a reference current. The voltage $V_{I\_REF}$ is applied to a non-inverting input of a second differential amplifier. The voltage $V_{I\_SENSED}$ at the CS input 210 is applied to an inverting input of the second differential amplifier. Accordingly, the voltage representing the sensed current is compared to the voltage representing the reference current by the second differential amplifier.

The output of the second differential amplifier is connected to a reset (R) input of a flip-flop, which has a data output (Q). The data output of the flip-flop is connected to gate driver circuitry, which controls the state of the gate drive signal on the GD output 216 of the PFC IC. When the data output of the flip-flop is at a high state, the GD output is active, which turns on the electronic switch 270 (FIG. 1). When the data output of the flip-flop is low, the GD output is inactive, which turns off the electronic switch.

When the data output (Q) of the flip-flop is turned on to turn on the gate driver circuitry, the electronic switch 270 turns on and current flows through the main winding 242 of the flyback transformer. The current through the main winding increase linearly from 0 to a maximum magnitude determined by the reference voltage $V_{I\_REF}$. The internal reference voltage $V_{I\_REF}$, which represents the magnitude of the reference current, is determined by the magnitude of the line voltage at the present phase angle. The rate of change of the line current through the main winding is also determined by the line voltage at the present phase angle. Accordingly, as described above, the time required for the magnitude of the line current to reach the magnitude of the reference current is the same ($T_{ON}$) throughout each half-cycle of the line voltage.

When the voltage representing the sensed current is greater than or equal to the voltage representing the reference current, the output of the differential amplifier transitions to a high state. The high value is applied to the reset input of the flip-flop to cause the output (Q) of the flip-flop to transition to a low state. The low state turns off the gate driver circuitry. Turning off the internal driver turns off the gate driver output on the GD output 216 of the PFC IC, which turns off the electronic switch 270. Turning off the electronic switch 270 causes current to cease flowing through the main winding 242 of the flyback transformer 240.

When the current abruptly ceases flowing through the main winding 242 of the flyback transformer 240, the charge built up in the flyback transformer switches to the secondary winding 246 to cause a decreasing discharge current to flow in the secondary winding. The decreasing discharge current causes the polarity of the voltage across the secondary winding to reverse such that the PFC circuit output diode 290 is forward biased. The discharge current from the flyback transformer flows through the PFC circuit output diode and charges the PFC circuit output filter capacitor 302 connected to the output node 300. The energy stored in the PFC circuit output filter capacitor is provided to the DC load 118 via the second stage 116.

The driver circuitry remains off until a set signal from a zero current detector circuit within the PFC IC 200 is applied to a set (S) input of the flip-flop. The zero current detector circuit receives the voltage at the second terminal of the current limiting resistor 264 (FIG. 1) on the zero current detector (ZCD) input 214.

As discussed above, when current is flowing from the first terminal 250 to the second terminal 252 of the main winding 242 of the flyback transformer 240, a negative voltage develops on the second terminal 256 of the auxiliary winding 244 with reference to the first terminal 254. The first terminal is connected to the ground reference 184. Although the auxiliary voltage across the auxiliary winding has a large magnitude, internal circuitry (not shown) within the PFC IC clamps the voltage on the ZCD input 214 such that the ZCD input remains at zero volts with respect to the ground reference while the current flowing through the main winding.

When current ceases flowing through the main winding 242 of the flyback transformer 240 and the current with the decreasing magnitude starts flowing through the secondary winding 246 of the flyback transformer, the polarity of the auxiliary winding also reverses such that a high auxiliary voltage with respect to the ground reference 184 appears on the second terminal 256 of the auxiliary winding. The high voltage is applied through the current limiting resistor 264 to the ZCD input 214 of the PFC IC 200. The PFC IC includes an internal Zener-type voltage clamp (not shown) that limits the input voltage at the ZCD input to approximately 5.7 volts.

The foregoing description is illustrated in FIGS. 4A, 4B, 4C and 4D for one half-cycle of the line voltage. A sinusoidal curve 500 in FIG. 4A (shown in dashed lines) represents the magnitude of the reference current $I_{REF}$ generated within the PFC IC 200 in response to the $V_{MULT}$ signal and the error signal, as described above. As described above, the magnitude of the reference current at any phase angle is directly proportional to the input line voltage at the phase angle.

A series of sawtooth-like pulses 510A-G represent the sensed current through the current sensing resistor 280. Each sawtooth-like sensed current pulse is synchronized with a respective one of a plurality of gate drive pulses 520A-G in FIG. 4D. Each gate drive pulse has a duration of $T_{ON}$, which is substantially constant as described above. Each gate drive pulse is followed by a respective 0-volt signal 522A-G having a respective off time $T_{OFF}$. As described above, the off times vary with respect to the phase angle θ of the input line voltage.

As illustrated, each sawtooth-like sensed current pulse 520A-G begins at 0 current at the onset of each gate drive pulse. The sawtooth-like sensed current pulses increase at a rate determined by the input line voltage at each phase angle. Accordingly, near the beginning and the end of each half-cycle where the input line voltage has lower magnitudes, the sawtooth-like sensed current pulses increase at a relatively slow rate (e.g., a relatively slow di/dt). The sawtooth-like sensed current pulses increase at the greatest rate at the midpoint (e.g., 90 degrees) of each half-cycle wherein the input line voltage has the greatest magnitude. Since the rate of increase of the sawtooth-like sensed current pulses and the magnitude of the reference current $I_{REF}$ are both directly proportional to the magnitude of the input line voltage at any phase angle, the time required for the magnitude of an increasing sawtooth-like sensed current pulse at any phase angle reaches the magnitude of the reference current in the same amount of time such that the $T_{ON}$ duration of each sawtooth-like sensed current pulse is the same throughout the entire half-cycle.

The electronic switch 200 is turned off when the magnitude of a sawtooth-like sensed current pulse 510A-G reaches the magnitude of the reference current $I_{REF}$. When the electronic switch is turned off, the flyback transformer 240 begins to discharge via the secondary winding 246 as described above. This effect is illustrated in FIG. 4B as a series of secondary current pulses 530A-G. Each secondary current pulse includes a respective leading (rising) edge 532 and a respective trailing (falling) edge 534. Each leading edge is shown as a rapid increase in the secondary winding current $I_{SEC}$ at the end of each gate drive pulse 520A-G (FIG. 4D). The initial magnitude of the secondary winding current is determined by the turns ratio of the main winding 242 to the secondary winding. For the purposes of the illustration in FIG. 4D, the initial magnitude of the secondary winding current is shown as being approximately twice the maximum magnitude of the respective sawtooth-like sensed current pulse 510A-G that charged the flyback transformer prior to the electronic switch turning off.

The respective trailing edge 534 of each pulse 530 of the secondary winding current $I_{SEC}$ represents a discharge at a rate determined by the circuit characteristics. The discharge rate is substantially constant; however, the discharge time is determined by the initial magnitude of each pulse. Accordingly, the trailing edges of the pulses near the beginning and the end of each half-cycle discharge in less time than the trailing edges of the pulses near the middle of each half-cycle. As shown in FIGS. 4A-4D, the variance in discharge times results in the $T_{OFF}$ times being variable in contrast to the constant $T_{ON}$ times.

As shown in FIG. 4C, the voltage at the ZCD input 214 of the PFC IC 200 caused by the auxiliary voltage across the auxiliary winding 244 is at approximately 0 volts when current is flowing through the main winding 242 of the flyback transformer 240 as described above. When the current stops flowing through the main winding at the end of each gate drive pulse 520A-G (FIG. 4D), the current flowing through the auxiliary winding 244 of the flyback transformer 240 also increases rapidly to cause a rapidly increasing voltage $V_{ZCD}$ at the ZCD input of the PFC IC as represented by a respective leading edge 542A-G of each of a plurality of voltage pulses 540A-G in FIG. 4C. As described above, the magnitude of the voltage at the ZCD input is clamped at 5.7 volts.

When the discharging current through the secondary winding 246 reaches 0, no voltage will be generated across the secondary winding and the auxiliary winding 244 of the flyback transformer 240. Thus, the voltage $V_{ZCD}$ applied to the ZCD input 214 of the PFC IC 200 will rapidly decrease to 0 volts at a slew rate determined by the circuit characteristics. The decrease in the voltage $V_{ZCD}$ is represented by a respective trailing edge 544A-G at the end of each voltage pulse 540A-G. When the voltage $V_{ZCD}$ reaches approximately 1.6 volts, the zero current detector within the PFC IC generates an internal set signal applied to the set (S) input of the flip-flop (FIG. 3). The Q output of the flip-flop changes state and the gate driver circuitry again generates an active gate drive signal on the GD output 216 of the PFC IC to cause the electronic switch 270 to turn on.

As described above, the end of the off time $T_{OFF}$ is determined by the voltage $V_{ZCD}$ reaching approximately 1.6 volts on the ZCD input 214 of the PFC IC 200. In the conventional two-stage electronic switching power supply 100 illustrated in FIG. 1, the end of the off time is determined by the discharge time of the current in the secondary winding 246. The discharge time is determined by the characteristics of the secondary circuitry. Accordingly, the THD shown in FIGS. 2A, 2B and 2C was previously considered to be inherent to the conventional two-stage electronic switching power supply illustrated in FIG. 1.

Although the discharge time of the current in the secondary winding cannot be controlled using the conventional L6562 PFC IC 200, the off time $T_{OFF}$ can be modified by increasing the slew rate of the trailing edge of the voltage V_ZCD applied to the ZCD input 214 of the PFC IC. This concept is illustrated in FIGS. 5A, 5B, 5C and 5D, which generally correspond to FIGS. 4A, 4B, 4C and 4D, respectively.

In FIG. 5A, a sinusoidal curve 550 (shown in dashed lines) represents the magnitude of the reference current $I_{REF}$ generated within the PFC IC 200 in response to the $V_{MULT}$ signal and the error signal, as described above. A series of sawtooth-like pulses 560A-G represent the sensed current through the current sensing resistor 280, which is the current through the main winding 242 of the flyback transformer 240 when the electronic switch 270 is turned on. The pulses are similar to the pulses 510A-G in FIG. 4A; however, the phase angles at which the pulses occur are different.

In FIG. 5D, a plurality of pulses 570A-G represent the gate drive signals that correspond to the on times $T_{ON}$ of the electronic switch 270, as described above with respect to FIG. 4D. Each gate drive pulse is followed by a respective zero voltage level 562A-G, which causes the electronic switch to turn off. Each zero voltage level corresponds to an off time $T_{OFF}$.

In FIG. 5B, a series of secondary current pulses 580A-G represent the discharge current in the secondary winding 246 of the flyback transformer 240. Each secondary current pulse includes a respective leading (rising) edge 582 and a respective trailing (falling) edge 584 as described above with respect to FIG. 5B.

In FIG. 5C, a plurality of voltage pulses 590A-G represent the voltage applied to the ZCD input 214 of the PFC IC 200 when the auxiliary winding 244 of the flyback transformer 240 is discharging. The voltage pulses have respective leading edges 592A-G and respective trailing edges 594A-G as described above with respect to FIG. 4C.

As shown in FIG. 5C, the leading edges 592A-G of each of the ZCD input pulses 590A-G rise rapidly as before. Unlike the corresponding trailing edges 542A-G in FIG. 4C, the trailing edges 592A-G in FIG. 5C, decrease at different rates at various phase angles in the half-cycle. In the illustrated example, the trailing edges 594C and 594D of the ZCD voltage pulses 590C and 590D near the middle of the half-cycle in FIG. 5C, decrease at substantially the same rate as the trailing edges 544C and 544D in FIG. 4C. Accordingly, the off times 572C and 572D (FIG. 5D) following the two ZCD voltage pulses near the middle are approximately the same as the corresponding off times 522C and 522D in FIG. 4D. In contrast, the trailing edges 594A and 594B of the ZCD voltage pulses 590A and 590B in FIG. 5C near the beginning of the half-cycle decrease at a slower rate than the trailing edges 544A and 544B of the corresponding pulses 540A and 540B in FIG. 4C. Similarly, the trailing edges 594E and 594F of the ZCD voltage pulses 590E and 590F near the end of the half-cycle decrease at a slower rate than the trailing edges 544E and 544F of the corresponding pulses 540E and 540F in FIG. 4C. The more slowly decreasing trailing edges in FIG. 5C reach the 1.6-volt threshold level later than the trailing edges in FIG. 4C. Thus, the off times 572A, 572B, 572E and 572F in FIG. 5D are greater than the corresponding off times 522A, 522B, 522E and 522F in FIG. 4D.

The effects of the longer off times near the beginning and near the end of each half cycle are illustrated in FIGS. 6A-6D. FIGS. 6A-6D correspond to FIGS. 2A-2D, respectively. In FIG. 6A, a voltage waveform 600 represents the input voltage $V_{IN}$ over a full cycle comprising a first half-cycle 602 between a phase angle of 0 and a phase angle of π and a second half-cycle 604 between a phase angle of it and a phase angle of 2π. A current waveform 610 represents an actual input current waveform $I_{IN\_ACT}$ over the full cycle. A current waveform 612 (shown as a dashed line) represents an ideal input current waveform $I_{IN\_IDEAL}$ over the full cycle. The voltage waveform is substantially sinusoidal. The ideal input current waveform is also substantially sinusoidal and is in phase with the input voltage. The actual input current waveform is also in phase with the input voltage. Unlike the previously described actual current waveform 410 in FIG. 2, which included substantial THD, the actual current waveform 610 in FIG. 6 has significantly less THD such the shape of the actual current waveform is much closer to the shape of a sinusoidal waveform. In particular, the magnitudes of the actual current waveform of FIG. 6 at phase angles near the beginning and the end of each half cycle are less than the magnitudes of the actual current waveform of FIG. 2 at corresponding phase angles.

The input voltage $V_{IN}$ is rectified by the rectifier circuit 112 such that the rectified voltage on the positive reference voltage output terminal 180 appears as two substantially identical positive half cycles as represented by a $V_{IN\_RECT}$ waveform 620 in FIG. 6B. The rectified actual input current is represented by an $I_{IN\_ACT}$ waveform 622 in FIG. 6B. The rectified ideal input current is represented by an $I_{IN\_IDEAL}$ waveform 624 (shown as a dashed line) in FIG. 6B. Each current waveform appears as two respective substantially identical half-cycles in FIG. 6B.

As shown in FIG. 6C, a waveform 630 represents a reference current ($I_{REF}$) magnitude within the PFC IC 200 to which the sensed current on the current sense (CS) input 210 is compared to determine when to turn of the gate drive. As illustrated by a gate drive (GD) waveform 640 in FIG. 6D, the PFC IC turns on the gate drive with a plurality of positive pulses 642 to turn on the electronic switch to enable current to flow through the main winding 242 of the flyback transformer 240. In FIG. 6D, each positive pulse 642 represents the on time ($T_{ON}$) of the electronic switch. Each positive pulse is followed by a zero voltage level 644, which represents an off time ($T_{OFF}$) of the electronic switch. As described above, the on times of the electronic switch are substantially constant as illustrated in FIG. 6D. On the other hand, the off times between the on times vary throughout each half cycle. The off times are greater near the middle of each half-cycle and are smaller near the beginning and the end of each half-cycle. However, in FIG. 6D, the off times following the first two positive on time pulses at the beginning of each half-cycle are longer than the corresponding off times in FIG. 2D. Similarly, the off times following the fifth and sixth positive on time pulses are also longer than the corresponding off times in FIG. 2D. The longer off times near the beginning of each half cycle and near the end of each half cycle cause the reduction in the magnitude of the rectified actual input current as represented by the $I_{IN\_ACT}$ waveform 622 in FIG. 6B for the reasons described above.

As previously shown in FIG. 2B, the current through the main winding 242 of the flyback transformer 240 is represented by a discontinuous winding current waveform 650 in FIG. 6C. The winding current waveform comprises a plurality of current pulses 652. Each current pulse comprises an increasing leading edge 654 and a decreasing trailing edge 656. Each leading edge increases at a rate determined by the instantaneous magnitude of the rectified input voltage at the positive reference voltage output terminal 180 of the rectifier circuit 112. Each trailing edge of each current pulse decreases without substantial delay as described above.

As described above, selectively increasing the off times ($T_{OFF}$) between the gate drive pulses 642 of FIG. 6D, which are applied to the electronic switch 270, reduces the magnitudes of the actual line current near the beginning and the end of each half-cycle of the AC input voltage. As further described above, the off times are selectively increased by reducing the rate at which the voltages of the trailing edge of the ZCD voltage pulses 590A, 590B, 590E and 590F (FIG. 5C) decrease after the secondary current ceases flowing through the secondary winding 246 of the flyback transformer 240.

FIG. 7 illustrates an improved two-stage electronic switching power supply 700, which corresponds to the previously described conventional two-stage electronic switching power supply 100 of FIG. 1. In the embodiment of FIG. 7, like elements are numbered as in FIG. 1, and the elements are interconnected as previously described. The first-stage circuit 114 of FIG. 1 is replaced with a modified first stage circuit 710 in FIG. 7. The modified first stage circuit of FIG. 7 includes a ZCD trailing edge control circuit 720.

The ZCD trailing edge control circuit 720 comprises a first phase detection resistor 730 and a second phase detection resistor 732. The ZCD trailing edge control circuit further comprises a phase detection transistor 734 and an edge control capacitor 736.

The first phase detection resistor 730 has a first terminal connected to the positive reference voltage output terminal 180 of the rectifier circuit 112. A second terminal of the first phase detection resistor is connected to a phase detection node 740. The second phase detection resistor 732 has a first terminal connected to the phase detection node. A second terminal of the second phase detection resistor is connected to the local circuit ground connection 184.

In the illustrated embodiment, the phase detection transistor 734 comprises a PNP bipolar junction transistor (BJT) having a base 750, an emitter 752 and a collector 754. The base of the phase detection transistor is connected to the phase detection node 740 of the phase detection circuit 720. The emitter of the phase detection transistor is connected to the second terminal of the current limiting resistor 264 and to the ZCD input 214 of the PFC IC 200. The collector of the phase detection transistor is connected to a first terminal of the edge control capacitor 736. A second terminal of the edge control capacitor is connected to the local circuit ground connection 184.

The ZCD trailing edge control circuit 720 operates by determining when the rectified AC input voltage $V_{IN\_RECT}$ has a magnitude corresponding to a phase angle between 0 and $\theta_1$ and corresponding to a phase angle between $\theta_2$ and $\pi$. If the magnitude corresponds to one of the two ranges of phase angles, the ZCD trailing edge control circuit modifies the trailing edges of the ZCD pulses as illustrated by the extended trailing edges 594A, 594B, 594E and 594F in FIG. 5C. If the magnitude corresponds to a phase angle not within the two ranges (e.g., between $\theta_1$ and $\theta_2$), the ZCD trailing edge control circuit does not modify the trailing edges of the ZCD pulses as illustrated by the non-extended trailing edges 594C and 594D in FIG. 5C.

The magnitude detection is accomplished by the first phase detection resistor 730 and the second phase detection resistor 732. The two resistors form a voltage divider between the rectified input voltage $V_{IN\_RECT}$ on the positive reference voltage output terminal 180 of the rectifier circuit 112 and the local circuit ground connection 184. The voltage on the phase detection node 740 has a magnitude $V_{NODE}$ proportional to the rectified input voltage in accordance with the following voltage divider equation based on a resistance $R_{730}$ of the first phase detection resistor and a resistance $R_{732}$ of the second phase detection resistor:

$$V_{NODE} = V_{IN\_RECT} |\sin(\theta)| \times \frac{R_{732}}{R_{730} + R_{732}} \quad (7)$$

Equation (7) is solvable for either the phase angle $\theta_1$ or the phase angle $\theta_2$ to select the resistances $R_{730}$ and $R_{732}$ such that the voltage on the phase detection node remains above the emitter voltage (e.g., approximately 5.7 volts) of the phase detection transistor 734 during the middle portion of each half-cycle between the phase angles $\theta_1$ and $\theta_2$. Thus, the emitter-base junction of the phase detection transistor is reverse biased, and the phase detection transistor does not conduct. Accordingly, the voltage on the ZCD input 214 of the PFC IC 200 is not affected by the ZCD trailing edge control circuit 720 during the middle portion of each half-cycle. For example, in one embodiment, the first phase detection resistor 730 has a resistance of approximately 43 kΩ (43,000 ohms) and the second phase detection resistor 732 has a resistance of approximately 850 kΩ (850,000 ohms), which sets the first phase angle $\theta_1$ at approximately 45 degrees after the beginning of each half cycle and which sets the second phase angle $\theta_2$ at 45 degrees before the end of each half cycle (e.g., at 135 degrees).

Near the beginning of each half-cycle (when the phase angle is less than $\theta_1$) and near the end of each half-cycle (when the phase angle is greater than $\theta_2$), the magnitude of the rectified input voltage $V_{IN\_RECT}$ is low. Thus, the emitter-base junction of the phase detection transistor 734 is forward biased when the $V_{ZCD}$ voltage pulses 540A-G are high when the flyback transformer 240 is discharging. The transistor conducts from the emitter to the collector. The conducting phase detection transistor charges the edge control capacitor 736. The conducting transistor also connects the edge control capacitor between the ZCD input 214 of the PFC IC 200 and the local circuit ground connection 184 such that the edge control capacitor is in parallel with internal circuitry of the PFC IC connected between the ZCD input and the local circuit ground connection 184. When the flyback transformer is discharged such that the current is no longer flowing through the auxiliary winding 244, the edge control capacitor does not discharge instantaneously. Rather, as illustrated by the trailing edges 594A, 594B, 594E and 594F in FIG. 5C, the edge control capacitor discharges at a slower discharge rate such that the voltage on the ZCD input of the PFC IC does not decrease to the 1.6-volt threshold for an additional amount of time after the flyback transformer is discharged. The discharge rate of the edge control capacitor can be controlled by selecting the capacitance of the edge control capacitor. For example, in one embodiment, the edge control capacitor has a capacitance of 47 pF (47 picofarads).

The method and the improved two-stage electronic switching power supply 700 described herein control the voltage on the ZCD input 214 of the PFC IC 200 to cause the average current $I_{AVG}$ through the main winding 242 of the flyback transformer 240 to be closer to the ideal input current $I_{IN\_IDEAL}$ over each half-cycle of the AC input voltage, thus reducing THD and thus improving the power factor of the 700. The method and the improved two-stage electronic switching power supply 700 accomplish the improvement by forcing a delay before turning the gate drive output 216 of e PFC IC on. The delay increases the off times near the beginning and the end of each half-cycle to selectively reduce the average current near the beginning and the end of each half-cycle to thereby reduce the THD. The turn on delay is accomplished by selectively switching the edge control capacitor 736 in parallel with the ZCD input of the PFC IC. Increasing the off time near the beginning and near the end of each half-cycle when the magnitude of the AC input voltage is low, results in a better input current waveform that is closer to a sinusoidal waveform. Dynamically adjusting the turn off delay as described herein improves THD and improves the power factor.

As described herein, the modified first stage circuit (PFC circuit) 710 operates in a hybrid mode. During the middle portion of each half-cycle when the phase detection transistor 734 remains off, the first stage circuit operates in the conventional critical conduction mode wherein the electronic switch 270 is turned on immediately after the flyback transformer 240 is discharged. During the portions of each half-cycle near the beginning and the near the end of each half-cycle, the first stage circuit operates in a discontinuous mode wherein a delay occurs after the flyback transformer is discharged and the electronic switch is turned on.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A voltage control circuit for controlling a detection voltage applied to a zero current detector input of a power factor corrector integrated circuit in a power supply circuit that receives a rectified AC input voltage having a time-varying magnitude referenced to a reference voltage, the power supply circuit including a flyback transformer having a primary winding, a secondary winding and an auxiliary winding, the auxiliary winding connected to the zero current detector input via a current limiting resistor, the voltage control circuit comprising:
    an electronic switch having a first terminal connected to the zero current detector input of the power factor corrector integrated circuit, the electronic switch having a second terminal and having a control terminal;
    a capacitor coupled between the second terminal of the electronic switch and the reference voltage;
    an input voltage detection circuit connected to receive the rectified AC input voltage and to apply a control voltage responsive to a magnitude of the rectified AC input voltage to the control terminal of the electronic switch, the control voltage selected to turn on the electronic switch for a first range of phase angles at the beginning each half-cycle of the rectified AC input voltage and to turn on the electronic switch for a second range of phase angles at the end of each half-cycle of the AC input voltage, the electronic switch coupling the capacitor to the zero current detector input to increase the fall times of the detection voltage when the AC input voltage is in either the first range of phase angles or the second range of phase angles.

2. The voltage control circuit as defined in claim 1, wherein the input voltage detection circuit comprises:
    a first resistor connected between a rectified AC input voltage terminal and a control node, the control node connected to the control terminal of the electronic switch; and
    a second resistor connected between the control node and the voltage reference such that the control voltage on the control node is proportional to the magnitude of the rectified AC input voltage multiplied by a resistance of the second resistor and divided by a sum of the resistance of the second resistor and a resistance of the first resistor.

3. The voltage control circuit as defined in claim 1, wherein:
    the electronic switch comprises a PNP bipolar junction transistor;
    the first terminal of the electronic switch is an emitter terminal of the transistor;
    the second terminal of the electronic switch is a collector terminal of the transistor; and
    the control terminal of the electronic switch is the base terminal of the transistor.

4. The voltage control circuit as defined in claim 1, wherein the reference voltage is a circuit ground voltage.

5. The voltage control circuit as defined in claim 1, wherein:
    the detection voltage applied to the zero current detector input terminal of the power factor corrector integrated circuit is clamped by the integrated circuit at a maximum level;
    the detection voltage decreases from the maximum level to a threshold level when the secondary winding completes discharging;
    the detection voltage decreases from the maximum level at a first rate when the electronic switch is turned off when the rectified AC input voltage is not within either the first range of phase angles or the second range of phase angles; and
    the detection voltage decreases from the maximum voltage level at a second rate when the electronic switch is turned on when the rectified AC input voltage is within either the first range of phase angles or the second range of phase angles, the second rate slower than the first rate.

6. A zero current detector control circuit that controls a voltage applied to a zero current detector (ZCD) input of a power factor corrector integrated circuit (PFC IC), the zero current detector control circuit comprising:
    a voltage detection input circuit configured to receive a rectified AC input voltage and to generate a control voltage at a control node, the control voltage proportional to an instantaneous magnitude of the rectified AC input voltage, the instantaneous magnitude increasing sinusoidally from a low magnitude to a peak magnitude during a first half of each half-cycle of the rectified AC input voltage and decreasing to the low magnitude during a second half of each half-cycle of the AC input voltage;

a capacitor having a first terminal and a second terminal, the second terminal of the capacitor coupled to a voltage reference;

an electronic switch having a control input, a first controlled terminal and a second controlled terminal, the control input of the electronic switch coupled to the control node of the voltage detection input circuit, the first controlled terminal of the electronic switch coupled to the ZCD input of the PFC IC, the second controlled terminal of the electronic switch coupled to the first terminal of the capacitor, the electronic switch responsive to the voltage on the control node being no greater than a threshold magnitude to turn on to couple the capacitor to the ZCD input of the PFC IC, the electronic switch being responsive to the voltage on the control node being greater than the threshold voltage to turn off to decouple the capacitor from the ZCD input of the PFC IC.

7. The zero current detector as defined in claim 6, wherein:

the electronic switch comprises a PNP bipolar junction transistor;

the first controlled terminal of the electronic switch is an emitter terminal of the transistor;

the second controlled terminal of the electronic switch is a collector terminal of the transistor; and the control input of the electronic switch is the base terminal of the transistor.

8. A flyback-type buck buck-boost converter comprising:

a converter input terminal that receives a rectified AC input voltage, the rectified AC input voltage having a time-varying magnitude with respect to a voltage reference;

a flyback transformer having a primary winding, a secondary winding and an auxiliary winding, the primary winding having a first terminal and a second terminal, the first terminal of the primary winding coupled to the converter input terminal;

an electronic switch having a first terminal, a second terminal and a control terminal, the first terminal of the electronic switch connected to the second terminal of the primary winding of the flyback transformer, the second terminal of the electronic switch connected to the voltage reference, the electronic switch turning on to enable current to flow through the primary winding of the flyback transformer, the electronic switch turning off to disable current flow through the primary winding of the flyback transformer and to cause current to discharge via the secondary winding of the transformer;

a power factor corrector integrated circuit (PFC IC) having a switch control output terminal connected to the control terminal of the electronic switch, the PFC IC further including:

a current sense input coupled to receive a voltage proportional to a current through the primary winding of the flyback transformer;

a multiplier input coupled to a multiplier input circuit to receive a voltage proportional to a magnitude of the rectified AC voltage; and a zero current detector input that receives a zero current detector input voltage responsive to an auxiliary voltage across the auxiliary winding of the flyback transformer, the zero current detector input voltage comprising pulses, each pulse having a leading edge that occurs when the electronic switch turns off and having a trailing edge that occurs when the secondary winding of the transformer is discharged;

and a trailing edge controller circuit having an input coupled to the converter input terminal to receive the rectified AC input voltage and having an output connected to the zero current detector input of the PFC IC, the trailing edge controller circuit operable when the rectified AC input voltage has a magnitude within a range of magnitudes to increase the duration of the trailing edge of each pulse of the zero current detector input voltage that occurs during the time when the rectified AC input voltage has a magnitude within the range of magnitudes.

9. The voltage control circuit as defined in claim 8, wherein the trailing edge controller circuit comprises:

a PNP bipolar junction transistor having an emitter, a collector and a base;

the emitter of the transistor is connected to the zero current detector input of the PFC IC;

a capacitor having a first terminal connected to the collector of the transistor and having a second terminal connected to the voltage reference; and a voltage sensing network having an input terminal coupled to receive the rectified AC input voltage and having an output node that generates a voltage proportional to the instantaneous magnitude of the AC input voltage, the output node connected to the base of the transistor, the transistor operable in response to a voltage below a threshold voltage to turn on to electrically couple the first terminal of the capacitor to the zero current detector input.

* * * * *